(12) United States Patent
Zick et al.

(10) Patent No.: US 7,741,809 B2
(45) Date of Patent: Jun. 22, 2010

(54) ELECTRICAL COMPONENT INCLUDING A BATTERY RECEPTACLE FOR INCLUDING A BATTERY

(75) Inventors: Jonathan A. Zick, Waukesha, WI (US); George L. Santana, New Berlin, WI (US); David J. Rozwadowski, Greenfield, WI (US); Jeffrey M. Zeiler, Delafield, WI (US); Scott David Schneider, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 825 days.

(21) Appl. No.: 11/621,035

(22) Filed: Jan. 8, 2007
(Under 37 CFR 1.47)

(65) Prior Publication Data
US 2008/0025010 A1 Jan. 31, 2008

Related U.S. Application Data

(60) Provisional application No. 60/757,195, filed on Jan. 6, 2006.

(51) Int. Cl.
*H01M 10/46* (2006.01)
(52) U.S. Cl. .................................................. 320/114
(58) Field of Classification Search ................. 320/106, 320/110, 112, 114, 115, 116; 429/96, 97, 429/98, 99, 100; D13/103
See application file for complete search history.

(56) References Cited

U.S. PATENT DOCUMENTS

| | | | |
|---|---|---|---|
| 1,823,066 A * | 9/1931 | Shapiro ...................... 429/159 |
| D134,136 S | 10/1942 | Sherman et al. |
| D134,818 S | 1/1943 | Fletcher |
| D163,645 S | 6/1951 | Shuler et al. |
| 2,565,273 A | 8/1951 | Shuler et al. |
| 2,582,330 A | 1/1952 | Hautala |
| 2,591,438 A | 4/1952 | Kinman et al. |
| 3,070,748 A | 12/1962 | Worobey et al. |
| 3,077,563 A | 2/1963 | Combs et al. |
| 3,079,510 A | 2/1963 | Hartwig |
| 3,089,072 A | 5/1963 | Jephcott |

(Continued)

FOREIGN PATENT DOCUMENTS

DE          7342534          3/1974

(Continued)

OTHER PUBLICATIONS

Bellman, Alfred H. et al., "Manpack: A New Solution to an Old Problem" *Signal* 31(7):Apr. 6-10, 1977.

*Primary Examiner*—Edward Tso
(74) *Attorney, Agent, or Firm*—Michael Best & Friedrich LLP

(57) ABSTRACT

An electrical component, such as, for example, a radio, an audio component, a battery charger or a radio/charger, is provided. The electrical component includes a housing and an electrical circuit supported by the housing. In some aspects, the electrical component is an audio component and the electrical circuit is an audio circuit. In other aspects, the electrical component is a battery charger and the electrical circuit is a charging circuit. In yet other aspects, the electrical component may define a receptacle capable of selectively receiving batteries of different heights. In further aspects, the electrical component may support a battery inclined relative to a surface upon which the battery sits.

18 Claims, 25 Drawing Sheets

U.S. PATENT DOCUMENTS

| | | |
|---|---|---|
| 3,267,510 A | 8/1966 | Cote |
| 3,458,794 A | 7/1969 | Bohnstedt et al. |
| 3,525,912 A | 8/1970 | Wallin |
| 3,533,119 A | 10/1970 | Dokos |
| 3,579,075 A | 5/1971 | Floyd |
| 3,852,652 A | 12/1974 | Jasinski |
| 3,883,789 A | 5/1975 | Achenbach et al. |
| 3,930,889 A | 1/1976 | Ruggiero et al. |
| 3,943,423 A | 3/1976 | Hoffman |
| 3,962,591 A | 6/1976 | Popka |
| 3,968,417 A | 7/1976 | Dials |
| 3,971,889 A | 7/1976 | Hays |
| D240,836 S | 8/1976 | Corvette |
| 3,984,645 A | 10/1976 | Kresch |
| 4,006,764 A | 2/1977 | Yamamoto et al. |
| 4,045,663 A | 8/1977 | Young |
| 4,050,493 A | 9/1977 | Cho |
| 4,072,800 A | 2/1978 | Gammer |
| 4,089,044 A | 5/1978 | Gatto et al. |
| 4,091,318 A | 5/1978 | Eichler et al. |
| 4,095,184 A | 6/1978 | Hochstein et al. |
| 4,101,818 A | 7/1978 | Kelly, III et al. |
| 4,147,163 A | 4/1979 | Newman et al. |
| 4,147,838 A | 4/1979 | Leffingwell |
| 4,194,157 A | 3/1980 | Uno |
| 4,214,197 A | 7/1980 | Mann et al. |
| 4,225,970 A | 9/1980 | Jaramillo et al. |
| 4,279,342 A | 7/1981 | Van Pelt |
| 4,281,377 A | 7/1981 | Evans |
| 4,290,002 A | 9/1981 | Piotti |
| 4,300,087 A | 11/1981 | Meisner |
| 4,315,109 A | 2/1982 | Jacobson |
| 4,382,219 A | 5/1983 | Heine et al. |
| 4,395,619 A | 7/1983 | Harigai |
| 4,424,006 A | 1/1984 | Armbruster |
| 4,431,717 A * | 2/1984 | Kikuchi ..................... 429/100 |
| 4,483,664 A | 11/1984 | Armbruster |
| 4,489,268 A | 12/1984 | Beachy |
| 4,491,694 A | 1/1985 | Harmeyer |
| 4,504,774 A | 3/1985 | Hoffman |
| 4,554,411 A | 11/1985 | Armstrong |
| 4,571,740 A | 2/1986 | Kirby et al. |
| 4,577,145 A | 3/1986 | Mullersman |
| 4,586,115 A | 4/1986 | Zimmerman et al. |
| 4,591,661 A | 5/1986 | Benedetto et al. |
| 4,605,993 A | 8/1986 | Zelina, Jr. |
| 4,628,242 A | 12/1986 | Scholefield |
| 4,645,996 A | 2/1987 | Toops |
| 4,673,861 A | 6/1987 | Dubovsky et al. |
| 4,684,870 A | 8/1987 | George et al. |
| 4,691,383 A | 9/1987 | DeMars |
| 4,694,486 A | 9/1987 | Yuter |
| 4,700,395 A | 10/1987 | Long |
| 4,709,201 A | 11/1987 | Schaefer et al. |
| 4,735,469 A | 4/1988 | Liggett |
| 4,737,702 A | 4/1988 | Koenck |
| 4,743,735 A | 5/1988 | Abura et al. |
| D296,243 S | 6/1988 | Ohashi |
| 4,751,452 A | 6/1988 | Kilmer et al. |
| 4,761,813 A | 8/1988 | Gammel |
| 4,766,361 A | 8/1988 | Pusateri |
| 4,816,735 A | 3/1989 | Cook et al. |
| 4,817,191 A | 3/1989 | Adams |
| 4,824,059 A | 4/1989 | Butler |
| 4,824,139 A | 4/1989 | Robbins |
| 4,835,409 A | 5/1989 | Bhagwat et al. |
| 4,857,702 A | 8/1989 | Cafaro |
| 4,870,702 A | 9/1989 | Azzouni |
| 4,875,878 A | 10/1989 | Meyer |
| 4,880,712 A | 11/1989 | Gordecki |
| 4,913,318 A | 4/1990 | Forrester |
| D307,829 S | 5/1990 | Hasuike |
| 4,927,021 A | 5/1990 | Taylor |
| 4,934,020 A | 6/1990 | Jackson |
| 4,939,912 A | 7/1990 | Leonovich, Jr. |
| 4,949,077 A | 8/1990 | Mbuthia |
| 4,949,386 A | 8/1990 | Hill |
| D310,529 S | 9/1990 | Yuen |
| 4,961,994 A | 10/1990 | Cariou et al. |
| 4,963,812 A | 10/1990 | Mischenko et al. |
| 4,993,061 A | 2/1991 | Hsieh |
| 4,998,055 A | 3/1991 | Nash et al. |
| D320,210 S | 9/1991 | Mbuthia |
| D320,600 S | 10/1991 | Yuen |
| D321,513 S | 11/1991 | Totsuka et al. |
| 5,076,405 A | 12/1991 | Modica |
| 5,077,513 A | 12/1991 | Dea et al. |
| 5,090,562 A | 2/1992 | Grullemans |
| 5,091,732 A | 2/1992 | Mileski et al. |
| 5,111,127 A | 5/1992 | Johnson |
| RE33,970 E | 6/1992 | Butler |
| D327,468 S | 6/1992 | Dea et al. |
| 5,122,721 A | 6/1992 | Okada et al. |
| 5,136,229 A | 8/1992 | Galvin |
| 5,138,245 A | 8/1992 | Mattinger et al. |
| 5,150,031 A | 9/1992 | James et al. |
| 5,155,428 A | 10/1992 | Kang |
| 5,164,652 A | 11/1992 | Johnson et al. |
| 5,164,830 A | 11/1992 | Kim |
| 5,170,851 A | 12/1992 | Kress et al. |
| 5,172,043 A | 12/1992 | Toops |
| D332,768 S | 1/1993 | Giard, Jr. |
| 5,179,747 A | 1/1993 | Zink |
| 5,187,422 A | 2/1993 | Izenbaard et al. |
| 5,191,277 A | 3/1993 | Ishikura et al. |
| 5,193,220 A | 3/1993 | Ichinohe et al. |
| 5,218,284 A | 6/1993 | Burns et al. |
| 5,220,269 A | 6/1993 | Chen et al. |
| 5,222,050 A | 6/1993 | Marren et al. |
| 5,235,822 A | 8/1993 | Leonovich, Jr. |
| 5,239,687 A | 8/1993 | Chen |
| 5,245,269 A | 9/1993 | Tooley et al. |
| 5,254,927 A | 10/1993 | Chiang |
| 5,254,931 A | 10/1993 | Martensson |
| 5,256,953 A | 10/1993 | Cimbal et al. |
| 5,262,710 A | 11/1993 | Taylor |
| 5,300,875 A | 4/1994 | Tuttle |
| 5,317,249 A | 5/1994 | Ford |
| 5,325,040 A | 6/1994 | Bogut et al. |
| D348,461 S | 7/1994 | Peersmann |
| D349,116 S | 7/1994 | Peersmann |
| 5,339,956 A | 8/1994 | Thomason |
| 5,343,136 A | 8/1994 | Yamaguchi et al. |
| 5,344,339 A | 9/1994 | Cheslock |
| 5,369,565 A | 11/1994 | Chen et al. |
| 5,369,797 A | 11/1994 | Tyree |
| 5,371,784 A | 12/1994 | Yankura |
| 5,391,972 A | 2/1995 | Gardner et al. |
| 5,394,073 A | 2/1995 | Nagai |
| 5,396,162 A | 3/1995 | Brilmyer |
| 5,404,419 A | 4/1995 | Artis, Jr. |
| D358,579 S | 5/1995 | Richards et al. |
| 5,424,725 A | 6/1995 | Wandt et al. |
| 5,434,018 A | 7/1995 | Sasaki et al. |
| 5,447,041 A | 9/1995 | Piechota |
| 5,459,388 A | 10/1995 | Illingworth et al. |
| 5,460,906 A | 10/1995 | Leon et al. |
| 5,462,814 A | 10/1995 | Fernandez et al. |
| 5,508,126 A | 4/1996 | Braun |
| 5,510,693 A | 4/1996 | Theobald |
| 5,552,692 A | 9/1996 | McKillop |
| 5,572,592 A | 11/1996 | Muckelrath |
| 5,584,055 A | 12/1996 | Murui et al. |
| 5,587,250 A | 12/1996 | Thomas et al. |

| Patent No. | Date | Inventor |
|---|---|---|
| 5,606,241 A | 2/1997 | Patino et al. |
| 5,625,237 A | 4/1997 | Saeki et al. |
| 5,633,096 A | 5/1997 | Hattori |
| 5,651,485 A | 7/1997 | Impastato, II |
| 5,656,917 A | 8/1997 | Theobald |
| 5,657,210 A | 8/1997 | Yamanaka |
| 5,680,026 A | 10/1997 | Lueschen |
| 5,685,421 A | 11/1997 | Gilmore |
| 5,689,171 A | 11/1997 | Ludewig |
| 5,694,467 A | 12/1997 | Young, III |
| D388,785 S | 1/1998 | Yuen |
| 5,715,546 A | 2/1998 | Kvalvik |
| 5,717,314 A | 2/1998 | Wakefield |
| 5,741,149 A | 4/1998 | Anthony |
| 5,752,205 A | 5/1998 | Dzung et al. |
| 5,764,030 A | 6/1998 | Gaza |
| 5,771,471 A | 6/1998 | Alberth, Jr. et al. |
| 5,792,573 A | 8/1998 | Pitzen et al. |
| 5,810,168 A | 9/1998 | Eggering |
| 5,814,968 A | 9/1998 | Lovegreen et al. |
| 5,834,921 A | 11/1998 | Mercke et al. |
| 5,847,541 A | 12/1998 | Hahn |
| 5,847,545 A | 12/1998 | Chen et al. |
| 5,870,149 A | 2/1999 | Comroe et al. |
| 5,889,383 A | 3/1999 | Teich |
| 5,949,216 A | 9/1999 | Miller |
| 5,969,592 A | 10/1999 | Reed |
| 5,979,175 A | 11/1999 | Ellison |
| 5,980,293 A | 11/1999 | Nagano |
| 5,998,966 A | 12/1999 | Gaza |
| 6,002,237 A | 12/1999 | Gaza |
| 6,007,940 A | 12/1999 | Spotnitz |
| D418,836 S | 1/2000 | Matt et al. |
| 6,014,011 A | 1/2000 | DeFelice et al. |
| 6,025,694 A | 2/2000 | Mercke et al. |
| 6,042,416 A | 3/2000 | Lopes |
| D423,518 S | 4/2000 | Milligan et al. |
| 6,049,192 A | 4/2000 | Kfoury et al. |
| 6,057,608 A | 5/2000 | Bailey, Jr. et al. |
| 6,058,320 A | 5/2000 | Yokota |
| 6,087,815 A | 7/2000 | Pfeifer et al. |
| 6,091,225 A | 7/2000 | Kim et al. |
| 6,104,292 A | 8/2000 | Rombom et al. |
| 6,124,699 A | 9/2000 | Suzuki et al. |
| 6,127,797 A | 10/2000 | Walker |
| 6,127,802 A | 10/2000 | Lloyd et al. |
| 6,154,008 A | 11/2000 | Bradus et al. |
| 6,160,378 A | 12/2000 | Helot et al. |
| 6,191,552 B1 | 2/2001 | Kates et al. |
| 6,215,276 B1 | 4/2001 | Smith |
| 6,223,835 B1 | 5/2001 | Habedank et al. |
| 6,230,029 B1 | 5/2001 | Hahn et al. |
| 6,233,343 B1 | 5/2001 | Muranami et al. |
| D444,451 S | 7/2001 | Bailey |
| 6,285,159 B1 | 9/2001 | Ki et al. |
| 6,298,245 B1 | 10/2001 | Usui et al. |
| 6,308,059 B1 | 10/2001 | Domes |
| 6,336,039 B1 | 1/2002 | Usui et al. |
| 6,374,127 B1 | 4/2002 | Park |
| 6,412,572 B2 | 7/2002 | Habedank et al. |
| 6,424,842 B1 | 7/2002 | Winstead |
| 6,427,070 B1 | 7/2002 | Smith |
| 6,453,824 B1 | 9/2002 | Dobbins |
| 6,456,837 B1 | 9/2002 | Domes |
| 6,490,436 B1 | 12/2002 | Kaiwa et al. |
| 6,496,688 B2 | 12/2002 | Smith |
| 6,502,949 B1 | 1/2003 | Horiyama et al. |
| 6,525,511 B2 | 2/2003 | Kubale et al. |
| D474,175 S | 5/2003 | Furusho et al. |
| D474,176 S | 5/2003 | Furusho et al. |
| D474,177 S | 5/2003 | Furusho et al. |
| 6,591,085 B1 | 7/2003 | Grady |
| D479,223 S | 9/2003 | Furusho et al. |
| 6,729,413 B2 | 5/2004 | Turner et al. |
| 6,788,026 B2 | 9/2004 | Muramatsu |
| 6,788,925 B2 | 9/2004 | Domes |
| 2003/0117107 A1* | 6/2003 | Zick et al. .................. 320/112 |
| 2004/0072064 A1 | 4/2004 | Turner et al. |
| 2004/0201989 A1* | 10/2004 | Raskas ...................... 362/253 |

FOREIGN PATENT DOCUMENTS

| | | |
|---|---|---|
| DE | 19905085 | 8/2000 |
| DE | 698 03 432 T2 | 8/2002 |
| EP | 0 090 480 A2 | 10/1983 |
| EP | 0 310 717 | 4/1989 |
| EP | 0 920 062 | 6/1999 |
| EP | 0 987 783 | 3/2000 |
| EP | 1 025 962 | 8/2000 |
| EP | 1 158 645 A1 | 11/2001 |
| EP | 1 213 815 A2 | 6/2002 |
| EP | 1 265 334 A2 | 12/2002 |
| EP | 1 311 012 | 5/2003 |
| GB | 2195841 A | 4/1988 |
| JP | 61197646 | 12/1986 |
| JP | 04150728 | 5/1992 |
| JP | 07307580 | 11/1995 |
| JP | 08195191 | 7/1996 |
| JP | 2001-85069 | 3/2001 |
| JP | 2003-234130 | 8/2003 |
| WO | WO 97/43921 | 11/1997 |
| WO | WO 03/105309 A1 | 12/2003 |

* cited by examiner

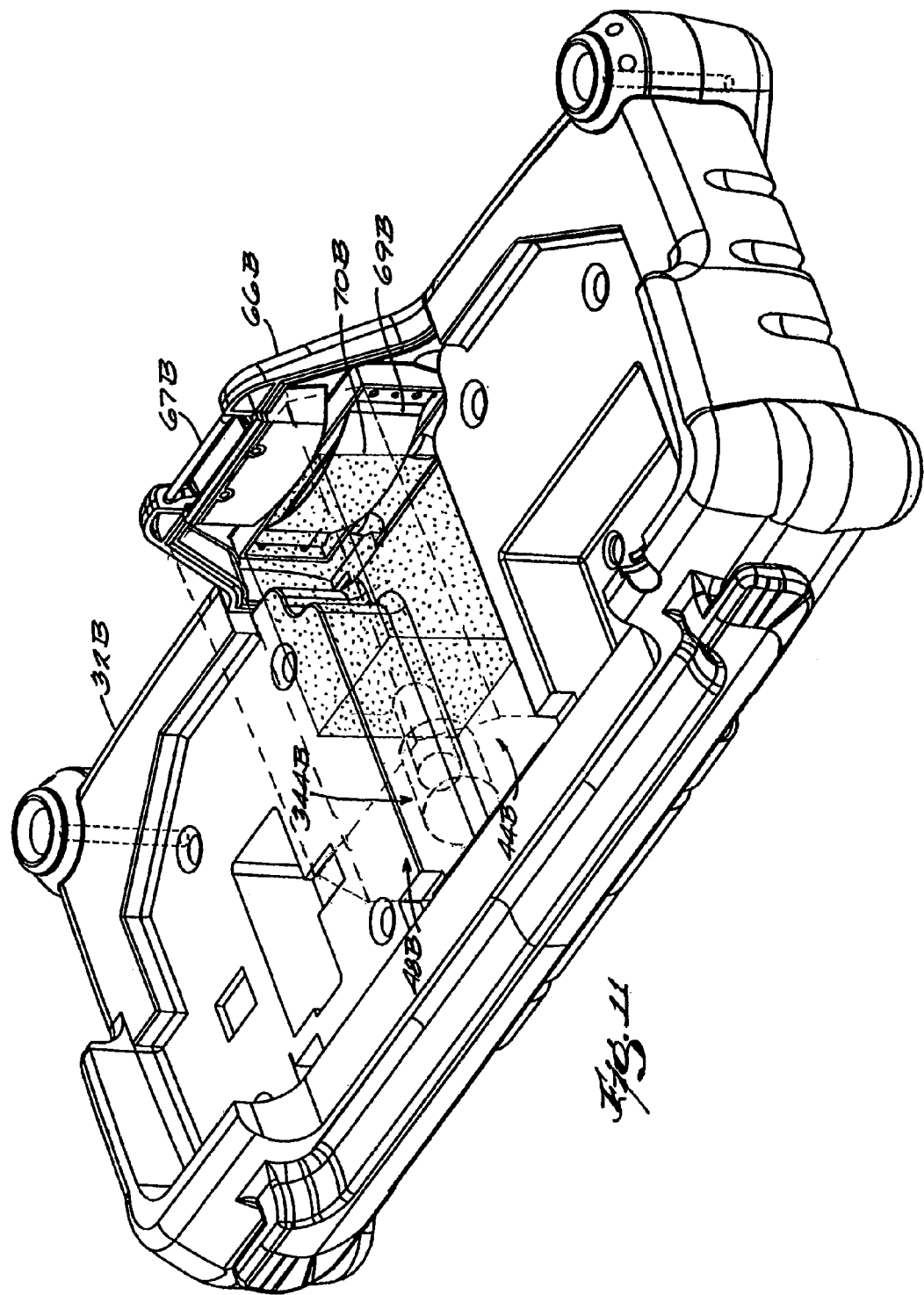

ELECTRICAL COMPONENT INCLUDING A BATTERY RECEPTACLE FOR INCLUDING A BATTERY

RELATED APPLICATIONS

The present application claims the benefit of U.S. Provisional Patent Application Ser. No. 60/757,195, filed Jan. 6, 2006, the entire contents of which are hereby incorporated by reference.

FIELD OF THE INVENTION

The present invention relates to electrical components and, more particularly, to, for example, a radio, an audio component, a battery charger or a radio/charger.

BACKGROUND

An electrical component, such as, for example, a radio, an audio component, a battery charger or a radio/charger, includes a component housing supporting an electrical circuit, such as an audio circuit, a charging circuit, or both, respectively. In some electrical components, such as the radio, a battery is electrically connectable to the audio circuit to operate the audio circuit to produce audio signals. In some electrical components, such as the battery charger, a battery is electrically connectable to the charging circuit to be charged by the charging circuit.

SUMMARY

One independent problem with the above-described electrical components is that the electrical component can only accommodate one type or size of battery in the electrical component's battery receptacle. For example, the construction of the receptacle may limit the battery size. Also, the position and structure of the assembly to connect the battery to the electrical component may limit the battery size.

Another independent problem with the above-described electrical components is that the battery is difficult to remove from the battery receptacle.

A further independent problem with the above-described electrical components is that the battery is free to move within the battery receptacle and, therefore, may become disconnected during work site operations.

Yet another independent problem with the above-described electrical components is that existing radios and audio components are not useable with a slide-on power tool battery.

Another independent problem with the above-described electrical components is the lack of storage for accessories useable with the electrical component, such as, for example, a cell phone and an auxiliary audio component.

A further independent problem with the above-described electrical components is that the electrical components are not rugged and may be damaged at a work site during normal and/or adverse working conditions.

The present invention generally provides an electrical component, such as, for example, a radio, an audio component, a battery charger or a radio/charger that substantially alleviates one or more of the above-described and other independent problems with existing electrical components. More particularly, in some constructions and in some aspects, the invention generally provides an electrical component, which accommodates batteries of different sizes. Also, in some constructions and in some aspects, the invention generally provides an electrical component in which the battery is biased out of the battery receptacle to move the battery to a more accessible position for removal. In addition, in some constructions and in some aspects, the invention generally provides an electrical component in which the battery is locked in a position relative to the electrical component housing. Further, in some constructions and in some aspects, the invention generally provides an electrical combination including an audio component and a slide-on power tool battery connectable to the audio component.

Also, in some constructions and in some aspects, the invention generally provides a combination including an electrical component and an accessory bag connectable to the electrical component to store accessories useable with the electrical component. In addition, in some constructions and in some aspects, the invention generally provides an electrical component having a rugged, durable construction and/or structure. Further, in some constructions and in some aspects, the invention generally provides an electrical component that can handle the size and power of larger batteries. Also, in some constructions and in some aspects, the invention generally provides an electrical component that is capable of dissipating heat from larger batteries.

More particularly, the invention provides an electrical component, such as an audio component, generally including an audio component housing, a circuit supported by the housing and operable to produce an audio signal, a battery being connectable to the housing and electrically connectable to the circuit, and a locking assembly operable to lock the battery in a position relative to the housing. The housing may define a receptacle, and the battery may be supportable in the receptacle. The audio component may further include a biasing member positioned in the receptacle, and the biasing member preferably biases the battery out of the receptacle. Preferably, the battery is a power-tool battery operable to power a power tool.

The locking assembly may include a locking projection on one of the battery and the housing and a recess defined by the other of the battery and the housing. Preferably, the locking projection is movable between a locked position, in which the projection engages the recess to lock the battery in a position relative to the housing, and an unlocked position, in which the battery is movable relative to the housing. The locking assembly may include an actuator operable to move the locking projection between the locked position to the unlocked position and/or between the locked position and the unlocked position. The locking assembly may also include a biasing member biasing the locking projection toward the locked position.

Also, the invention provides an electrical component, such as a battery charger, generally including a charger housing, a charging circuit supported by the housing and selectively connectable with a power source, a battery being connectable to the housing and electrically connectable with the charging circuit such that the charging circuit is selectively operable to charge the battery, and a locking assembly operable to lock the battery in a position relative to the housing.

In addition, the invention provides an electrical component generally including a housing defining a receptacle, an electrical circuit supported by the housing, a battery being supportable in the receptacle and connectable to the electrical circuit, and a biasing member operable to bias the battery out of the receptacle to an ejected position. The biasing member may be supported within the receptacle. The housing may also include a cover selectively closing an open end of the receptacle. The cover may include a second biasing member selectively biasing the battery into the receptacle.

In some constructions, the electrical component may be an audio component, and the electrical circuit may be an audio circuit for producing an audio signal. In some constructions, the electrical component may be a battery charger, and the electrical circuit may be a charging circuit connectable to the battery and operable to charge a battery. The battery may be a power tool battery, such as, a slide-on power tool battery or a tower power tool battery.

The electrical component may also include an electrical connector assembly for connecting the battery to the electrical circuit. The electrical connector assembly may be supported in the receptacle. The electrical connector assembly may include a support portion supporting the battery. The support portion may be movable relative to the housing, and a biasing member may bias the support portion toward an open end of the receptacle to bias the battery to the ejected position.

The electrical component may also include a locking assembly operable to lock the battery in a position relative to the housing. In some constructions, the locking assembly may be a cover supported by the housing and selectively closing the open end of the receptacle to lock the battery in the receptacle.

In some constructions, the locking assembly may include a locking projection on one of the battery and the electrical connector assembly and a recess defined by the other of the battery and the electrical connector assembly. The locking projection may be movable between a locked position, in which the projection engages the recess to lock the battery in a position relative to the electrical connector assembly, and a unlocked position, in which the battery is movable relative to the electrical connector assembly.

In some constructions, the locking assembly may include a locking projection on one of the electrical connector assembly and the housing and a recess defined by the other of the electrical connector assembly and the housing. The locking projection may be movable between a locked position, in which the projection engages the recess to lock the electrical connector assembly in a position relative to the housing, and an unlocked position, in which the electrical connector assembly is movable relative to the housing. In these constructions, the locking assembly may also include an actuator movable between a locked position and an unlocked position. The locking projection is in the locked position thereof when the actuator is in the locked position thereof, and the locking projection is in the unlocked position thereof when the actuator is in the unlocked position thereof.

Further, the invention provides an electrical combination generally including an electrical component, such as an audio component, including an audio component housing having a support portion, and a circuit supported by the housing and operable to produce an audio signal, and a slide-on power tool battery supportable by the support portion of the housing and operable to power a power tool.

Also, the invention provides an electrical component generally including a housing defining a receptacle, an electrical circuit supported by the housing, and a connector assembly movably supported by the housing and connecting a battery to the electrical component. The battery may be one of a first battery having a first dimension and a second battery having second dimension. The first dimension is different than the second dimension. The receptacle may selectively receive one of the first battery and the second battery. The receptacle may accommodate only one of the first battery and the second battery at a time. The connector assembly is preferably movable relative to the housing to selectively accommodate the first battery and the second battery.

The connector assembly may include a support portion movable relative to the housing, and the battery is preferably supportable on the support portion. One of the battery and the support portion may include a projection and the other of the battery and the support portion may define a recess. The projection is preferably engageable in the recess to connect the battery to the connector assembly.

The connector assembly may also include a connector terminal assembly connected to the electrical circuit and movable relative to the housing. The battery may include a battery terminal assembly, and the battery terminal assembly is preferably connectable to the connector terminal assembly to connect the battery to the electrical circuit. The support portion and the connector terminal assembly may be preferably movable relative to the housing.

In addition, the invention provides an electrical component generally including a housing defining a receptacle having an open end, the housing includes a cover selectively closing the open end of the receptacle, and an electrical circuit supported by the housing, a first battery being supportable in the receptacle and connectable to the electrical circuit, the first battery having a first dimension, a second battery being supportable in the receptacle and connectable to the electrical circuit, the second battery having a second dimension, the first dimension being different than the second dimension, the receptacle selectively receiving one of the first battery and the second battery.

The electrical component may further include a movable support portion positioned in the receptacle for selectively supporting one of the first battery and the second battery. One of the support portion and the one of the first battery and the second battery may include a projection and the other of the support portion and the one of the first battery and the second battery may define a recess, the projection may be engageable in the recess to support the one of the first battery and the second battery on the support portion. The movable support portion may include a track with a protrusion and a recess and at least one electrical connector thereon. The track and electrical connector may be movable in relation to the housing. The electrical component may further include a locking assembly supported by the housing and operable to lock one of the first battery and the second battery to the housing.

Further, the invention provides a combination generally including an electrical component having a housing defining a well portion in a rear of the housing, and an electrical circuit supported by the housing, and an accessory bag selectively connectable to the housing at least partially within the well portion.

The accessory bag may include a handle. The accessory bag may define an opening to facilitate passing of electrical cords from inside the accessory bag to outside the accessory bag. The accessory bag may further include at least one flap for selectively covering the opening. The accessory bag may alternatively include at least one zipper for selectively closing the opening.

The combination may further include at least one housing connector supported on the housing and at least one bag connector supported on the accessory bag. The housing connector and the bag connector may be operable to selectively connect to one another to selectively support the accessory bag on the housing. The combination may further include an electrical plug supported on the housing and electrically connected to the electrical circuit.

In addition, the invention provides an electrical component supportable on a support surface, the electrical component including a housing defining a receptacle for receiving a battery, the battery including a top surface and a bottom surface, at least a portion of the top surface and the bottom surface being substantially planar, an electrical circuit supported by the housing, and a base coupled to the housing, the base including a front portion protruding from a bottom surface of the base and being engageable with the support surface, and a rear portion protruding from the bottom surface of the base and being engageable with the support surface, the front portion having a first height and the rear portion have a second height less than the first height, wherein at least one of the base bottom surface, the planar portion of the battery top surface and the planar portion of the battery bottom surface is inclined relative to the support surface when the battery is positioned in the receptacle and the front and rear portions of the base engage the support surface.

Further, the invention provides an audio component supportable on a support surface, the audio component including a housing defining a receptacle for receiving a power tool battery, the power tool battery including a top surface and a bottom surface, at least a portion of the top surface and the bottom surface being substantially planar, an audio circuit supported by the housing and operable to produce an audio signal, and a base coupled to the housing, the base including a front portion protruding from a bottom surface of the base and being engageable with the support surface, and a rear portion protruding from the bottom surface of the base and being engageable with the support surface, the front portion having a first height and the rear portion have a second height less than the first height, wherein at least one of the base bottom surface, the planar portion of the battery top surface and the planar portion of the battery bottom surface is inclined relative to the support surface when the power tool battery is positioned in the receptacle and the front and rear portions of the base engage the support surface.

Also, the invention provides an electrical component including a housing defining a receptacle having an open end, the housing including a cover selectively closing the open end of the receptacle, and an electrical circuit supported by the housing, a first battery having a first height being supportable in the receptacle and electrically connectable to the electrical circuit, a second battery having a second height different than the first height being supportable in the receptacle and electrically connectable to the electrical circuit, the receptacle selectively receives one of the first battery and the second battery.

In addition, the invention provides an audio component including a housing defining a receptacle having an open end, the open end having a receptacle height, the housing including a cover selectively closing the open end of the receptacle, and an audio circuit supported by the housing and operable to produce an audio signal, a first power tool battery having a first height being supportable in the receptacle and electrically connectable to the audio circuit, a second power tool battery having a second height different than the first height being supportable in the receptacle and electrically connectable to the audio circuit, wherein the receptacle height is greater than the first height and the second height, and the receptacle selectively receives one of the first power tool battery and the second power tool battery.

Independent features and independent advantages of the invention will become apparent to those skilled in the art upon review of the detailed description and drawings.

BRIEF DESCRIPTION OF THE DRAWINGS

FIG. 12 is a side elevation view of a battery and an alternate construction of a support portion for the electrical component.

Figure 1:
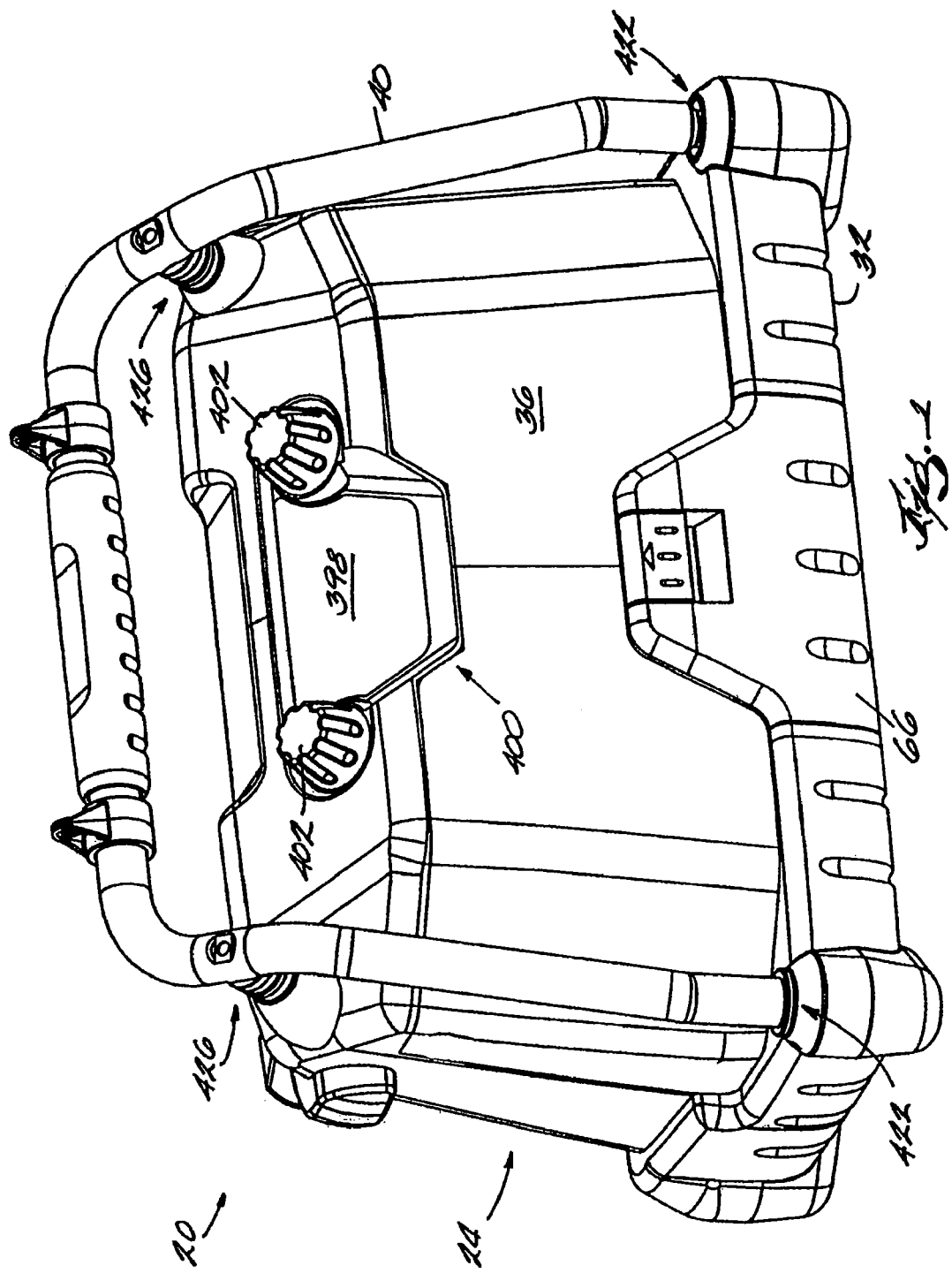
FIG. 1 is a front perspective view of an electrical component embodying the invention.

Before at least one embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION

FIG. 1 illustrates an electrical component 20, such as a combination radio and power tool battery charger, embodying the present invention. It should be understood that, in other constructions, the electrical component 20 may include another audio component, such as, for example, a tape player, a CD player, a MP3 player, a jukebox, etc. It should also be understood that, in some constructions and for some aspects of the invention, the electrical component 20 may be another electrical component, such as, for example, an audio component, a battery charger, a power tool, a cell phone charger, a power supply for other electrical equipment, etc.

Features of the electrical component 20 are described and illustrated in U.S. Pat. No. 6,982,541, issued Jan. 3, 2006 (U.S. Ser. No. 10/291,868, filed Nov. 8, 2002), the entire contents of which is hereby incorporated by reference.

Figure 2:
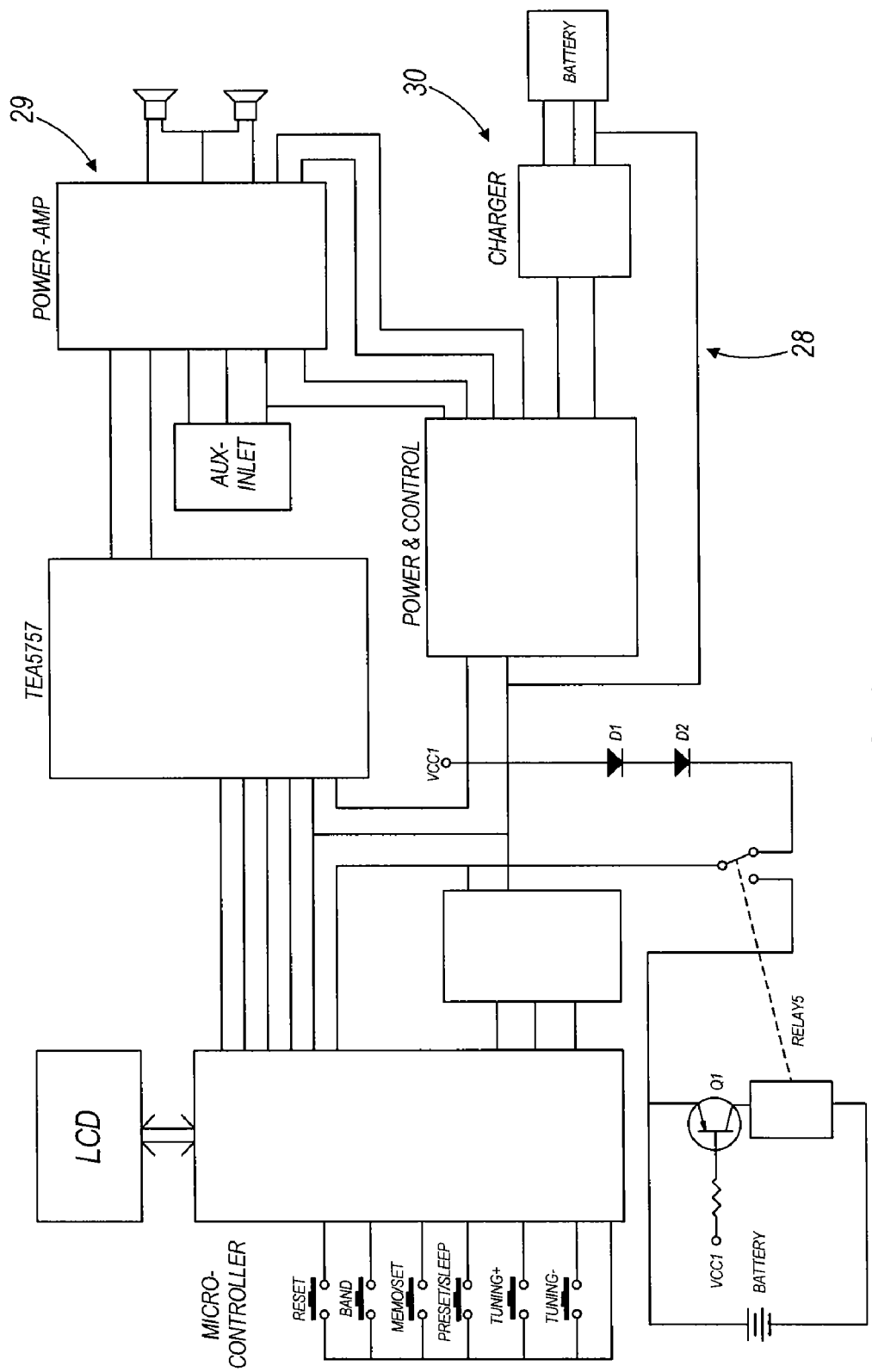
FIG. 2 is a schematic diagram of an electrical circuit for the electrical component.

The electrical component 20 includes an electrical component housing 24 and an electrical circuit 28 (schematically illustrated in FIG. 2) supported by the housing 24. In the illustrated construction, the electrical circuit 28 is a combination radio and battery charging circuit having an audio circuit portion 29, operable to produce an audio signal, and a charging circuit portion 30, operable to charge a battery. It should be understood that, in other constructions and for some aspects of the invention, the electrical circuit 28 may be any type of electrical circuit, such as, for example, an audio circuit for producing an audio signal or a charging circuit for charging a battery.

The electrical circuit 28 is connectable to a power source, which supplies power to the electrical circuit 28. The power source may include an AC power source, such as line power (through a power cord (not shown)), or a DC power source, such as a battery. In the illustrated construction, the audio circuit portion 29 is selectively powered by an AC power source or by a DC power source. The AC power source can be the primary power source for the electrical circuit 28, and the DC power source can be a secondary or back-up power source. Also, in the illustrated construction, the charging circuit portion 30 is connectable to a power source to charge the battery.

As explained below in more detail, the electrical circuit 28 includes a power amplifier circuit portion for amplifying an input, such as a signal from an auxiliary component, to the audio circuit portion 29. The electrical circuit 28 also includes a power supply portion which may be connected through a power outlet on the electrical component 20 to power other electrical devices (including the auxiliary component).

As shown in FIG. 1, the housing 24 includes a base portion 32, a main portion 36, and a handle portion 40. The base portion 32, the main portion 36, and the handle portion 40 are designed to have impact absorbing characteristics which protect the electrical component 20 from impacts at a jobsite, such as from falling from a height or having another object impact the electrical component 20, which might normally damage the elements of the electrical component 20, such as, for example, the elements of the electrical circuit 28, and/or create an electrical hazard in the electrical component 20. For example, the housing 24 may be formed of energy/impact absorbing materials, such as, for example, high-density polyethylene (HDPE), and/or formed with energy/impact absorbing structures, such as, for example, bars, base edges, bumpers, bushings, ribs, honeycombs, energy-absorbing shapes, etc. In the illustrated construction, at least the base portion 32 is blow-molded from an energy/impact absorbing material, such as, for example, high-density polyethylene (HDPE).

Figure 3:
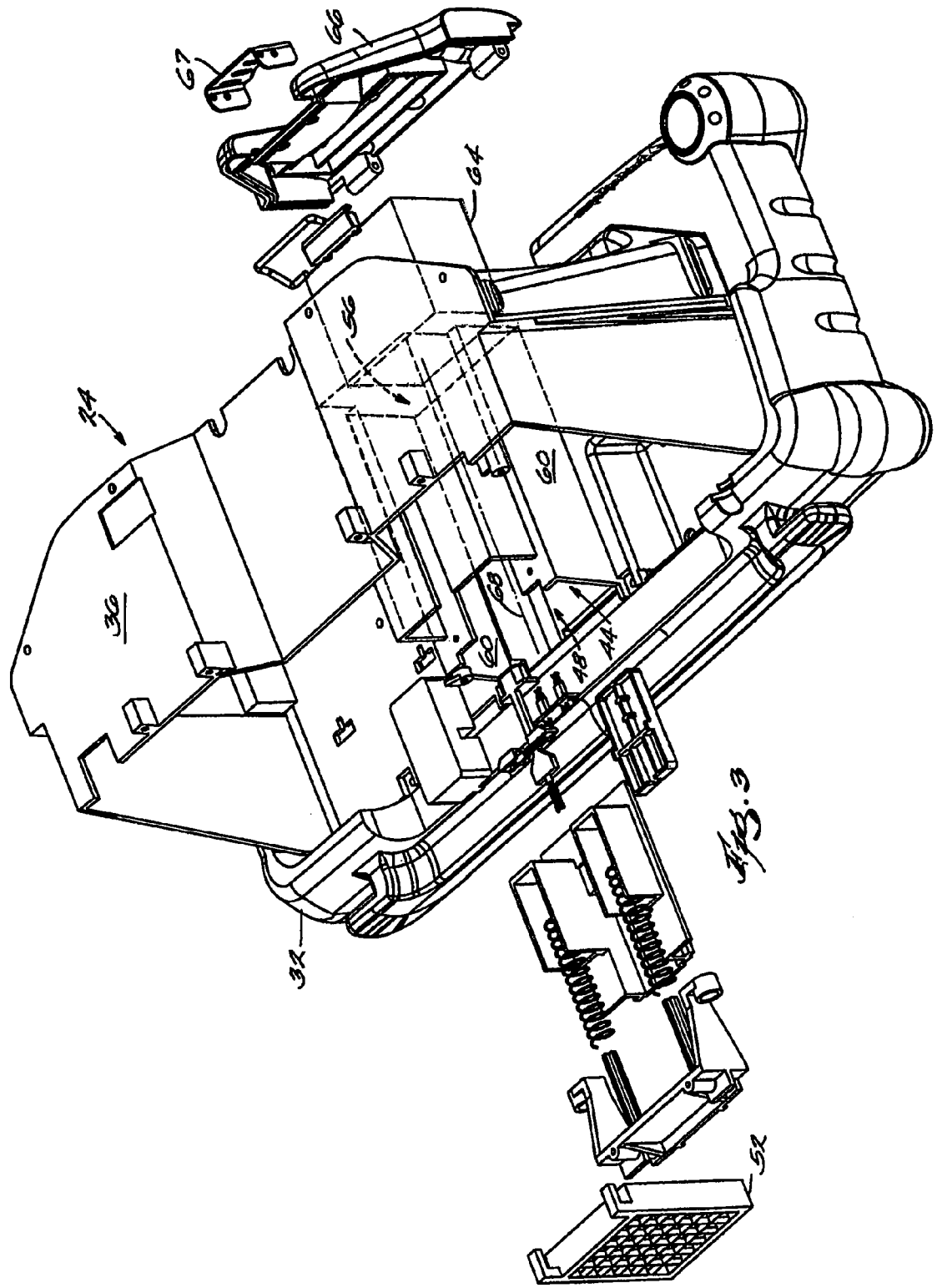
FIG. 3 is an exploded rear perspective view of a portion of the electrical component shown in FIG. 1.

As shown in FIG. 3, the housing 24 defines a receptacle 44 having a closed end 48, defined by a bumper 52 (discussed below), an open end 56, and side walls 60 extending from the closed end 48 to the open end 56. A battery 64 is inserted into the receptacle 44 along an insertion axis 68. The battery 64 is electrically connected to the electrical circuit 28 to, in the illustrated construction, selectively provide power to the electrical circuit 28 or be charged by the charging circuit portion 30 of the electrical circuit 28. However, the battery 64 is monitored by and disconnected from the electrical circuit 28, as necessary, to prevent deep discharge of the battery 64. Such deep discharge prevention is described in U.S. Pat. No. 6,211,652, issued on Apr. 3, 2001, which is hereby incorporated by reference. A manner of preventing deep discharge is low voltage shutdown. In instances where the voltage drops below a desired level (e.g., 10.5+/−5%), the electrical component will latch off automatically. The following example is provided to illustrate low voltage shutdown. As an example, a 28V battery is used with the electrical component. When running the 28V battery at low volumes and the battery enters pulse mode, the average voltage is 12V, which is higher than the 10.5V set for low voltage shutdown. Accordingly, the electrical component will still operate and a ticking noise will be heard while the battery remains in pulse mode. This ticking will continue until the battery voltage reaches about 10.5V, which will cause the electrical component to shutdown. Once the electrical component has shutdown due to a low voltage battery, the electrical component can be reset by cycling the main power switch of the electrical component or by removing the battery for a period of time. In some instances, the period of time may be a few minutes.

For purposes of description, "forward" is defined as being in the direction of the open end 56 along the insertion axis 68. Similarly, "rearward" is defined relative to "forward" as being in the direction of the closed end 48 and away from the open end 56 along the insertion axis 68.

Figure 4:
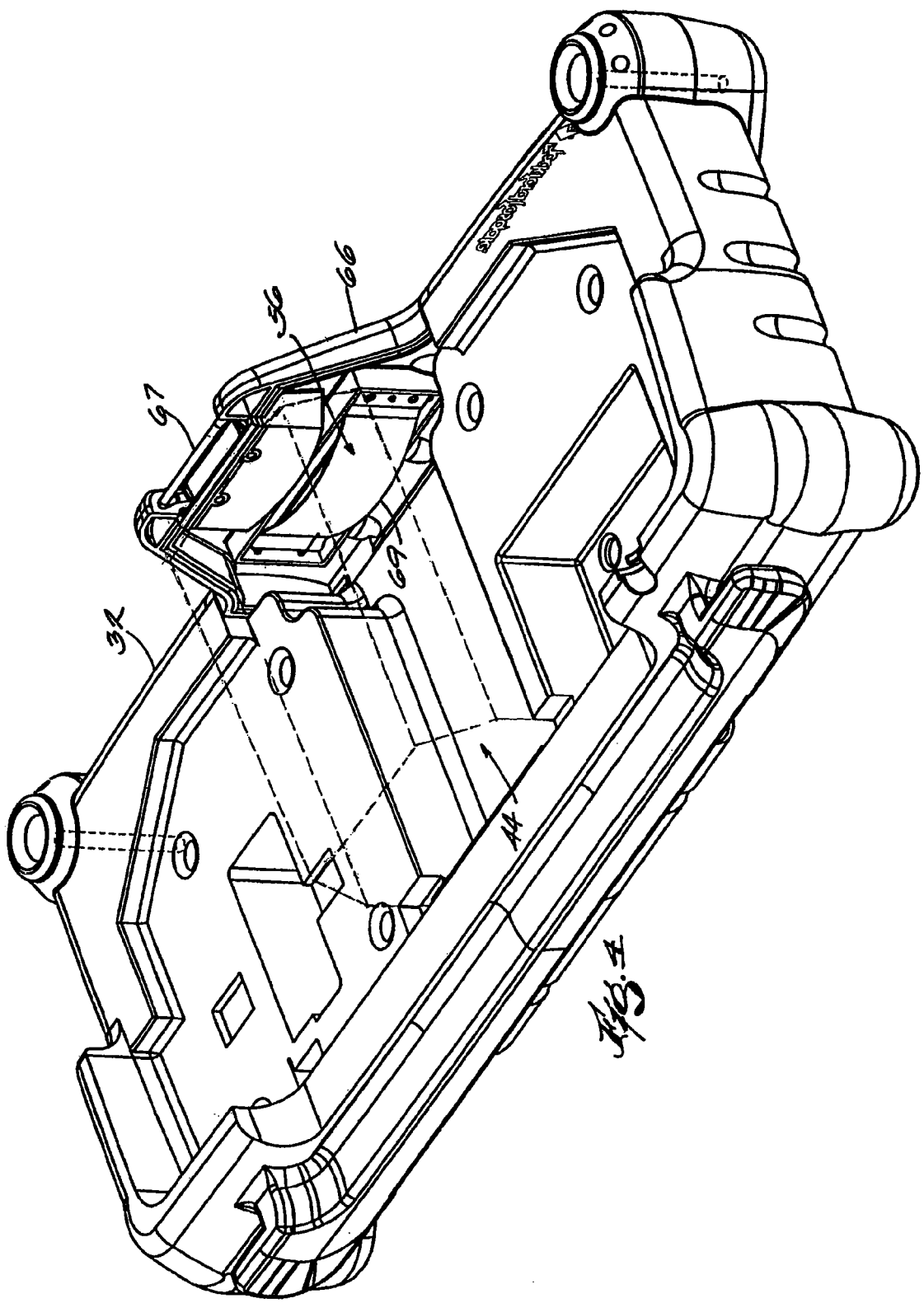
FIG. 4 is a rear perspective view of a portion of the electrical component shown in FIG. 1.

As shown in FIG. 4, the housing 24 includes a cover 66 pivotally connected to the base portion 32 for selectively closing the open end 56 of the receptacle 44. A latching member 67 is selectively lockable to the main portion 36 (see FIG. 1) to lock the cover 66 in a closed position (shown in FIG. 1). A cover biasing member 69 is mounted on the interior surface of the cover 66. When the cover 66 is closed, the biasing member 69 engages and biases the battery 64 (see FIG. 3) into the receptacle 44 to maintain proper electrical connection, as described below in more detail, during normal operations or during and after an impact condition.

Figure 5:
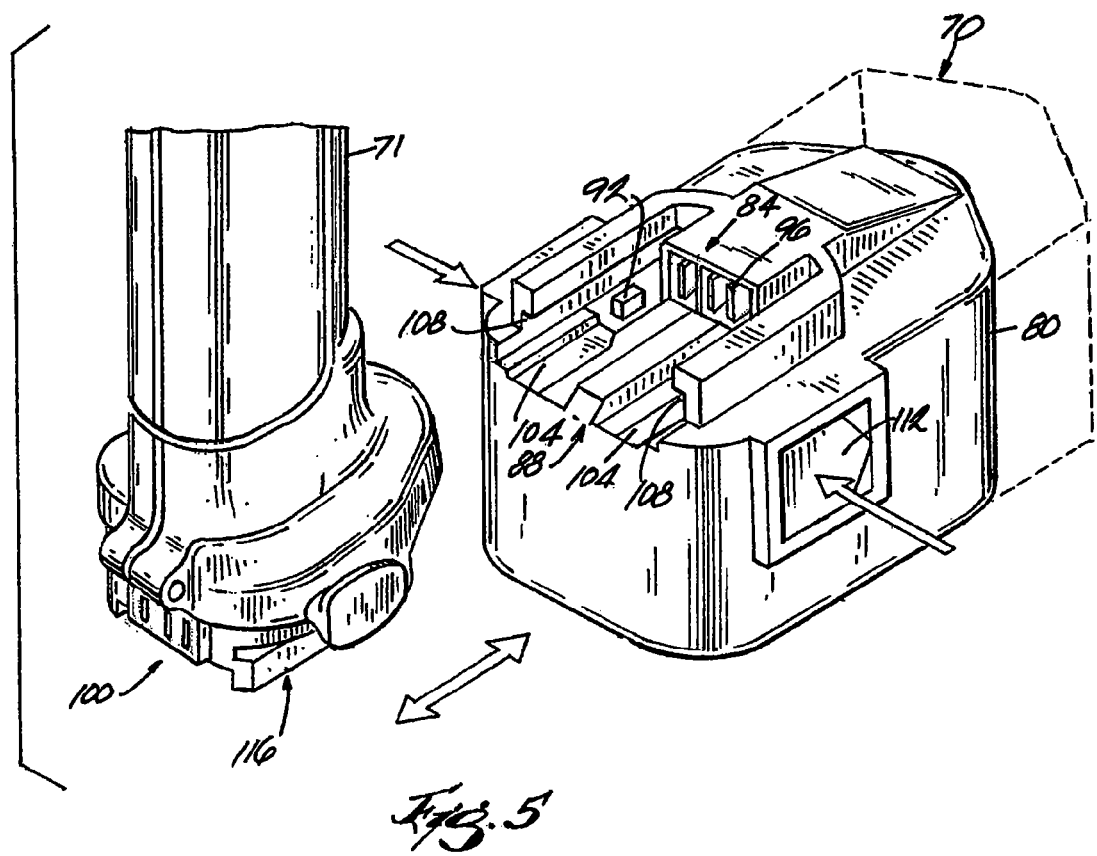
FIG. 5 is a perspective view of a battery and a portion of a power tool.

As shown in FIG. 5 and in the illustrated construction, the battery 64 is a slide-on power tool battery 70 operable to power a power tool 71, such as, for example, a drill, a circular saw, a reciprocating saw, etc. The slide-on battery 70 is slidably mountable on the power tool 71. In the illustrated construction, the slide-on battery 70 includes a battery housing 80 supporting a number of battery cells (not shown), a battery terminal assembly 84, a battery support portion 88, and locking members or locking tabs 92 (one shown). The terminal assembly 84 facilitates electrical connection between the battery cells and a motor (not shown) of the power tool 71 and/or the circuit 28 of the electrical component 20.

In the illustrated construction, the support portion 88 of the slide-on battery 70 has a generally C-shaped cross-section provided by grooves 104 and rails 108 which extend parallel to the insertion axis 68 (see FIG. 3). The locking tabs 92 are supported in the C-shaped support portion 88 and are movable perpendicular to the insertion axis 68 by depressing locking tab actuators or buttons 112 (one shown).

In the illustrated construction, the power tool 71 includes a generally T-shaped power tool support portion 116 and a power tool terminal assembly 100. The support portion 88 of the battery 70 is complementary to the support portion 116 of the power tool 71, and, therefore, the complementary components physically and electrically connect the battery 70 to the power tool 71. The locking tabs 92 engage in recesses (not shown) on the power tool support portion 116 to provide a battery locking assembly between the battery 70 and the power tool 71.

It should be understood that, in other constructions (not shown), the battery 70 may be a different type of slide-on power tool battery, such as, for example, a battery having a T-shaped cross-section. In such constructions, the power tool and the electrical component would have a complementary C-shaped cross-section support portion.

It should also be understood that slide-on batteries have a variety of sizes depending on the number and orientation of the cells in the battery housing. In the illustrated construction, the slide-on battery 70 has a first dimension, such as an axial length, and another slide-on battery (shown in phantom in FIG. 5) has a second dimension, such as a second axial length, which is different than that of the first slide-on battery 70.

In addition, it should be understood that the electrical component 20 is usable with batteries having different battery chemistries (i.e., Lithium-based chemistries (Li, Li-ion, etc.), Nickel Metal Hydride (NiMH), Nickel Cadmium (NiCd), etc.). The electrical circuit 28 and the charging circuit portion 30 include identification circuitry and structure necessary to identify the chemistry of the battery 70 to ensure proper charging and operation of the battery 70.

In an alternate construction and in some aspects, the electrical component 20 is usable with a tower power tool battery 72 (see FIG. 11), discussed below in more detail. Also, in other constructions (not shown) and in some aspects, the electrical component 20 may be used with other types and sizes of batteries.

Figure 6:
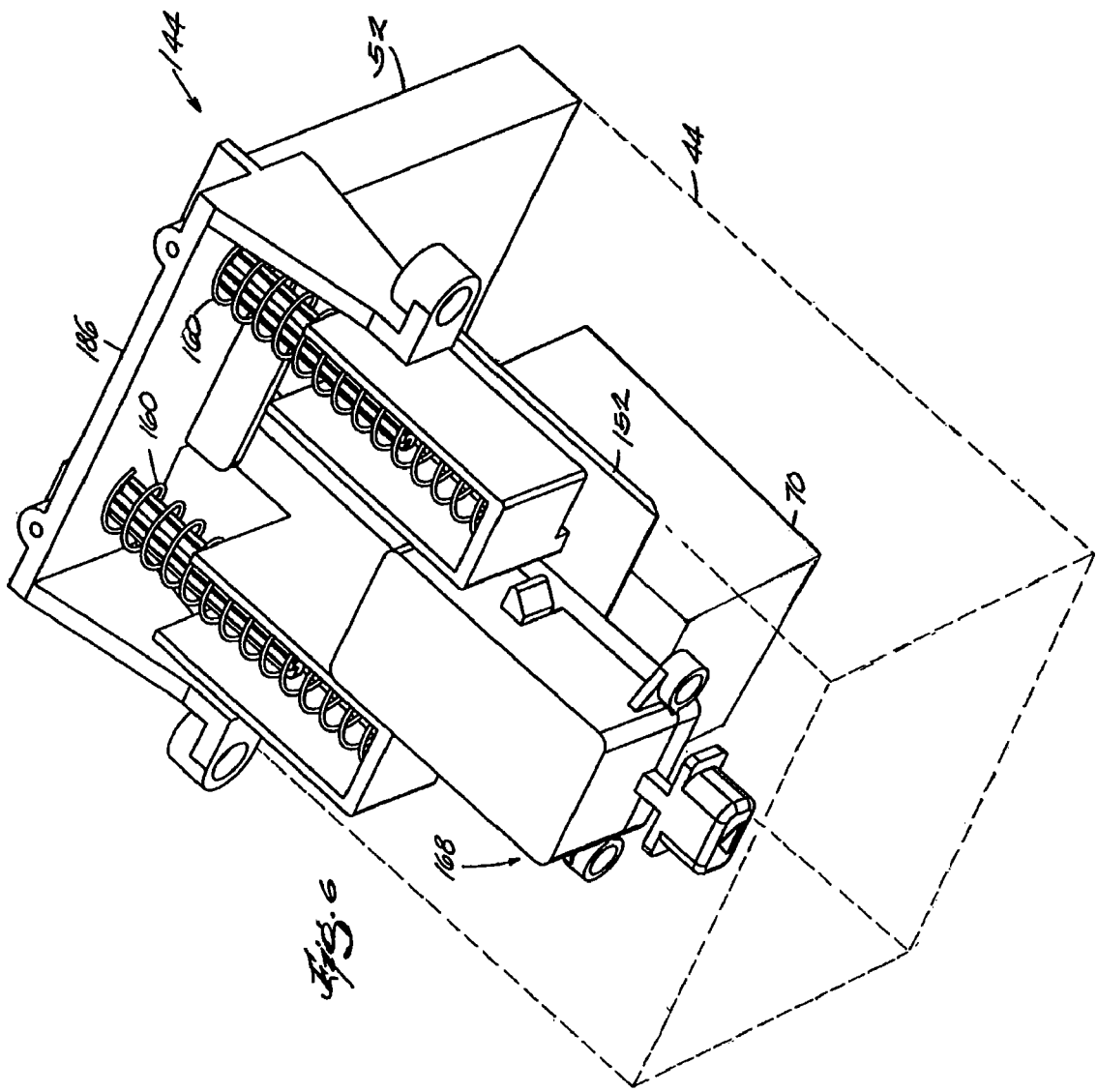
FIG. 6 is a top perspective view of an electrical connector assembly shown in FIG. 3.
Figure 7:
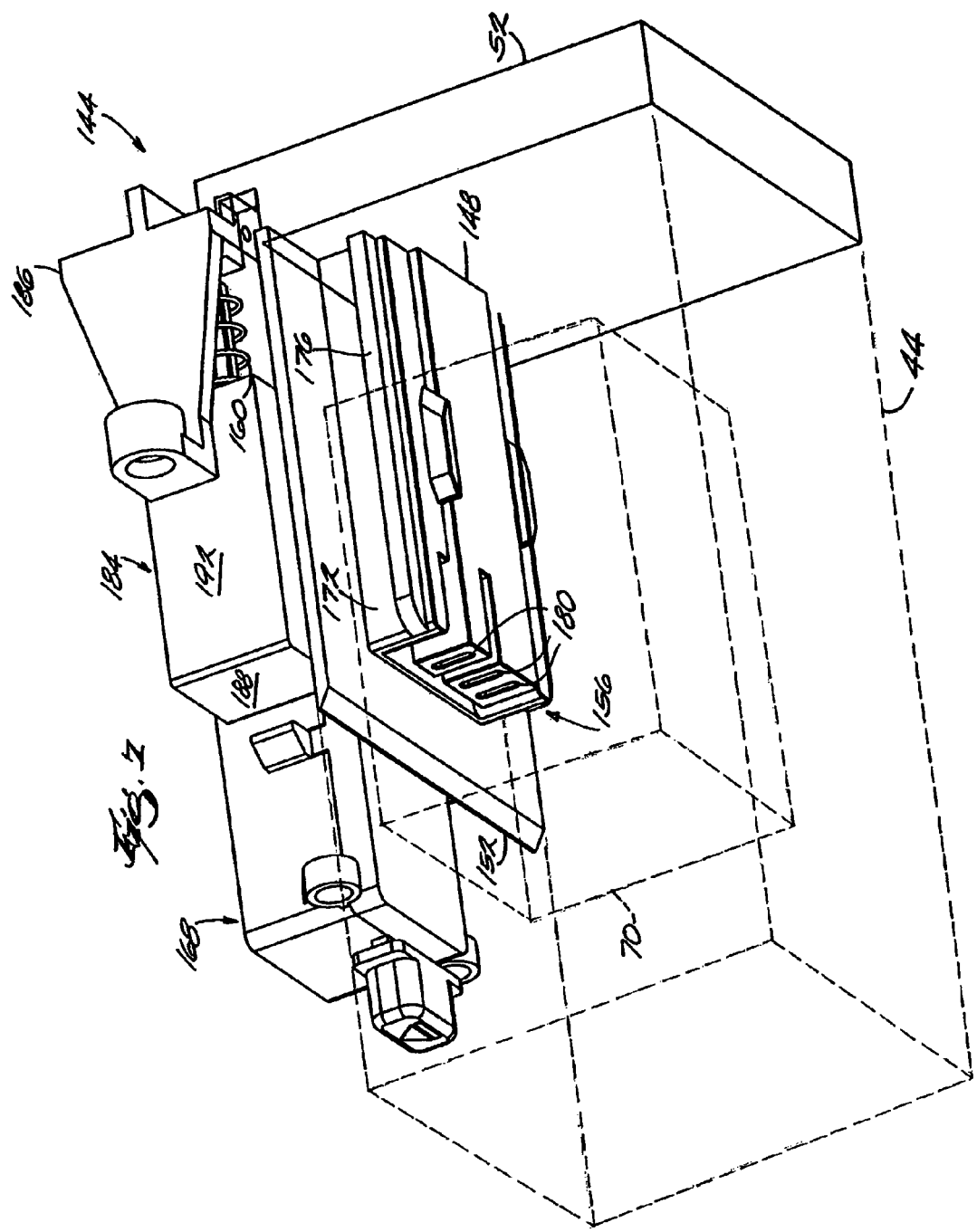
FIG. 7 is a bottom perspective view of the electrical connector assembly shown in FIG. 6.

As shown in FIGS. 6 and 7, the housing 24 supports an electrical connector assembly 144 positioned in the receptacle 44. The connector assembly 144 includes a support portion 148, a body portion 152, a terminal assembly 156, biasing members 160, the bumper 52, and a locking assembly 168. In the illustrated construction, the support portion 148 and the terminal assembly 156 move within the receptacle 44 relative to the housing 24, in a direction parallel to the insertion axis 68 (see FIG. 3), upon the insertion and the ejection of the battery 70 into and out of the receptacle 44, respectively. In part, this movement accommodates batteries of different sizes.

As shown in FIG. 7, the support portion 148 of the connector assembly 144 is substantially similar to the support portion 116 of the power tool 71 (see FIG. 5) with which the battery 70 is normally used. The support portion 148 includes grooves 172 and protrusions 176 which extend parallel to the insertion axis 68 (see FIG. 3). The grooves 172 and protrusions 176 of the connector assembly 144 are complementary to the grooves 104 and rails 108 of the battery 70 and, therefore, support the battery 70 on the support portion 148.

The terminal assembly 156 is mounted on the support portion 148 and is electrically connectable to the battery terminal assembly 84 to connect the battery cells to the electrical circuit 28. In the illustrated construction, the terminal assembly 156 is movable with the support portion 148 relative to the housing 24.

Figure 8:
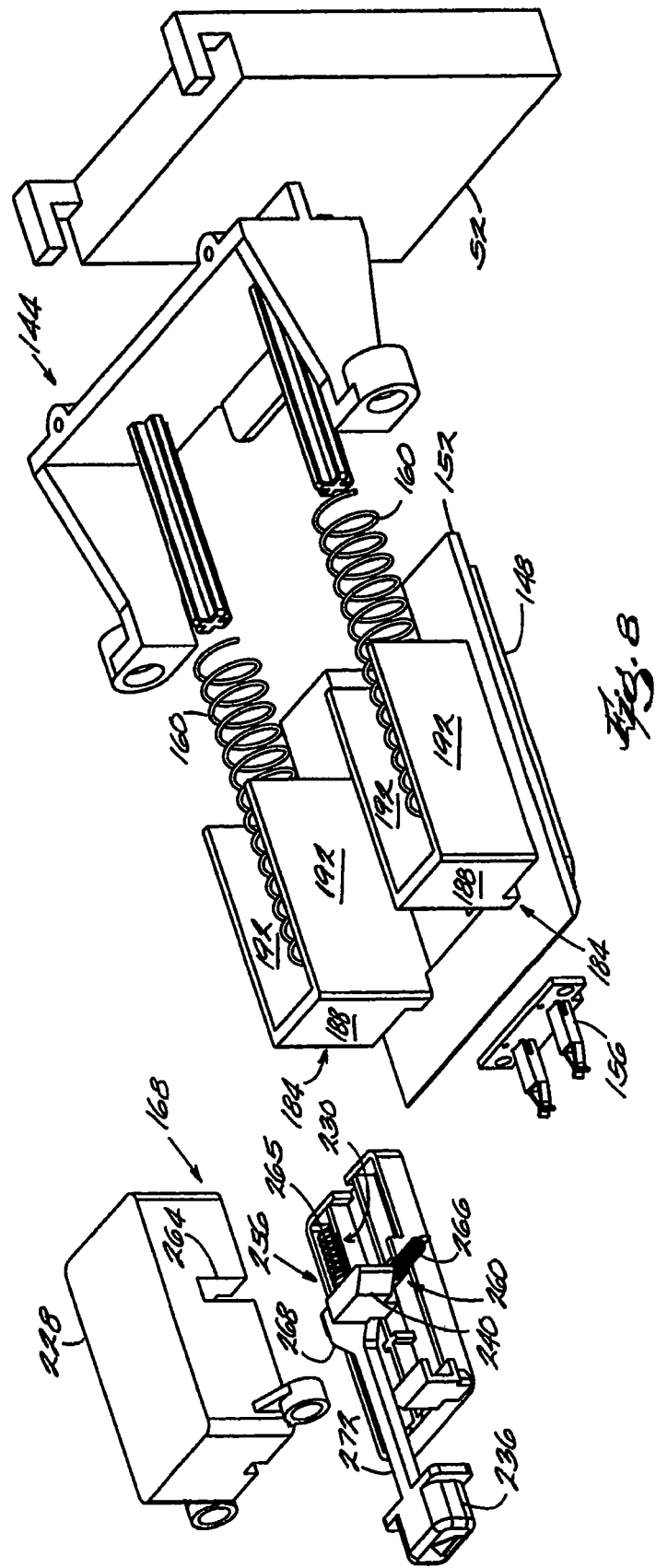
FIG. 8 is an exploded top perspective view of the electrical connector assembly shown in FIG. 6.

As shown in FIGS. 7 and 8, the support portion 148 is mounted on the underside of the body portion 152 and guide channels 184 are provided on the body portion 152. The biasing members 160 are positioned in the channels 184. The channels 184 maintain the alignment of the biasing members 160 during compression and expansion of the biasing members 160. The biasing members 160 bias the support portion 148 and the body portion 152 (and the battery 70, when supported on the support portion 148) toward the open end 56 of the receptacle 44. In the illustrated construction, the biasing members 160 are compression springs. In other constructions (not shown), the biasing members 160 may be other types of springs or other structure, such as, for example, elastomeric material.

In the construction shown in FIG. 8, the locking assembly 168 locks the support portion 148, the body portion 152, and the attached battery 70 in an axial position relative to the housing 24. The locking assembly 168 includes a housing 228, a biasing assembly 230, an actuator 236, and locking protrusions 240 (one shown). The locking assembly 168 has at least one locked condition (shown in FIG. 6), in which the support portion 148 and attached battery 70 are locked in an axial position relative to the housing 24, and an unlocked condition, in which the support portion 148 and attached battery 70 are axially movable relative to the housing 24.

The housing 228 defines (see FIG. 8) a first path 256, parallel to the insertion axis 68 and along which the actuator 236 travels, and a second path 260, generally perpendicular to the insertion axis 68 and along which the locking protrusions 240 travel. The housing 228 defines openings 264 (one shown) in both sides through which the locking protrusions 240 selectively protrude.

The biasing assembly 230 includes an actuator biasing member 265 and a locking protrusion biasing member 266. The actuator biasing member 265 lies in the first path 256 and biases the actuator 236 toward the open end 56 of the receptacle 44 and toward a position corresponding to a locked condition of the locking assembly 168. The locking protrusion biasing member 266 lies in the second path 260 and, in the illustrated construction, biases the locking protrusions 240 toward the retracted, unlocked position.

The actuator 236 controls movement of the locking protrusions 240. In the illustrated construction, the actuator 236 biases the locking protrusions 240 toward the locked position and allows the locking protrusions 240 to move to the unlocked position. The actuator 236 is positioned between the locking protrusions 240 and has a wide portion 268 and a narrow portion 272. The locking protrusion biasing member 266 biases the locking protrusion 240 inward toward the actuator 236. The locking protrusions 240 lie in the second path 260 and are operable to selectively extend out of the openings 264 (a locked position) and retract into the openings 264 (the unlocked position).

In the locked position, the wide portion 268 of the actuator 236 contacts the locking protrusions 240 and moves the locking protrusions 240 out of the openings 264 against the biasing force of the locking protrusion biasing members 266. In the locked position, the locking protrusions 240 prevent the end walls 188 of the guide channels 184 from moving forward of the locking protrusions 240, and, therefore, limit the movement of the support portion 148 and body portion 152 (and the battery 70, when supported on the support portion 148) toward the open end 56 of the receptacle 44. Thus, the support portion 148, the body portion 152, and the battery 70 are locked in an axial position relative to the electrical component housing 24. In the locked condition of the connector assembly 144, the support portion 148 is capable of moving in the space between the bumper 52 and the locking protrusions 240. This movement enables the electrical component 20 to receive different sized batteries 70 within the receptacle 44.

As the battery 70 is inserted, the support portion 148 is moved rearwardly until the openings 264 are uncovered. When this occurs, the actuator 236 moves forwardly and moves the locking protrusions 240 to extend out of the openings 264. The locking protrusions 240 extend into the axial path of the guide channels 184 and prevent the support portion 148 and the body portion 152 (and the battery 70, when supported on the support portion 148) from moving forwardly beyond the position of the locking protrusions 240.

To unlock the locking assembly 168, the actuator 236 is pressed inwardly. As the actuator 236 is depressed against the actuator biasing member 265, the wide portion 268 of the actuator 236 slides out of contact with the locking protrusions 240. The locking protrusion biasing members 266 move the locking protrusions 240 inwardly as the narrow portion 272 slides between the locking protrusions 240, and the locking protrusions 240 retract into the openings 264, eventually terminating contact with the end walls 188 (the unlocked position). This allows the support portion 148 to move towards the open end 56 of the receptacle 44 to place the battery 70 in a more readily accessible position for removal from the receptacle 44 (the ejected position). In the illustrated construction, the biasing members 160 move the support portion 148 and the battery 70 forwardly to the more accessible position.

In other constructions (not shown), the locking assembly 168 may be a ratchet-type locking assembly having more than one axially-spaced locked position of the support portion 148 relative to the housing 24. As the battery is inserted, the support portion 148 may be moved through the locked positions to the most appropriate locked position based on, for example, the length of the battery 70.

In other constructions (not shown), the actuator and the locking protrusion may cooperate in another manner such as through cooperating structure, such as, for example, a pin and a groove.

In other constructions, for example, the actuator and the locking protrusion may operate in a different manner, such as, the actuator may move the locking protrusion to the unlocked position and the actuator may allow the locking protrusion to move to the locked position.

In other constructions (not shown), the actuator 236 may move in a different manner, such as, for example, vertically, laterally, or pivotally, to allow movement of and/or to move the locking protrusions 240 between the locked position and the unlocked position.

In other constructions (not shown), the locking protrusions 240 may move in a different manner, such as, for example, vertically, axially, or pivotally, between the locked position and the unlocked position.

Figure 9:
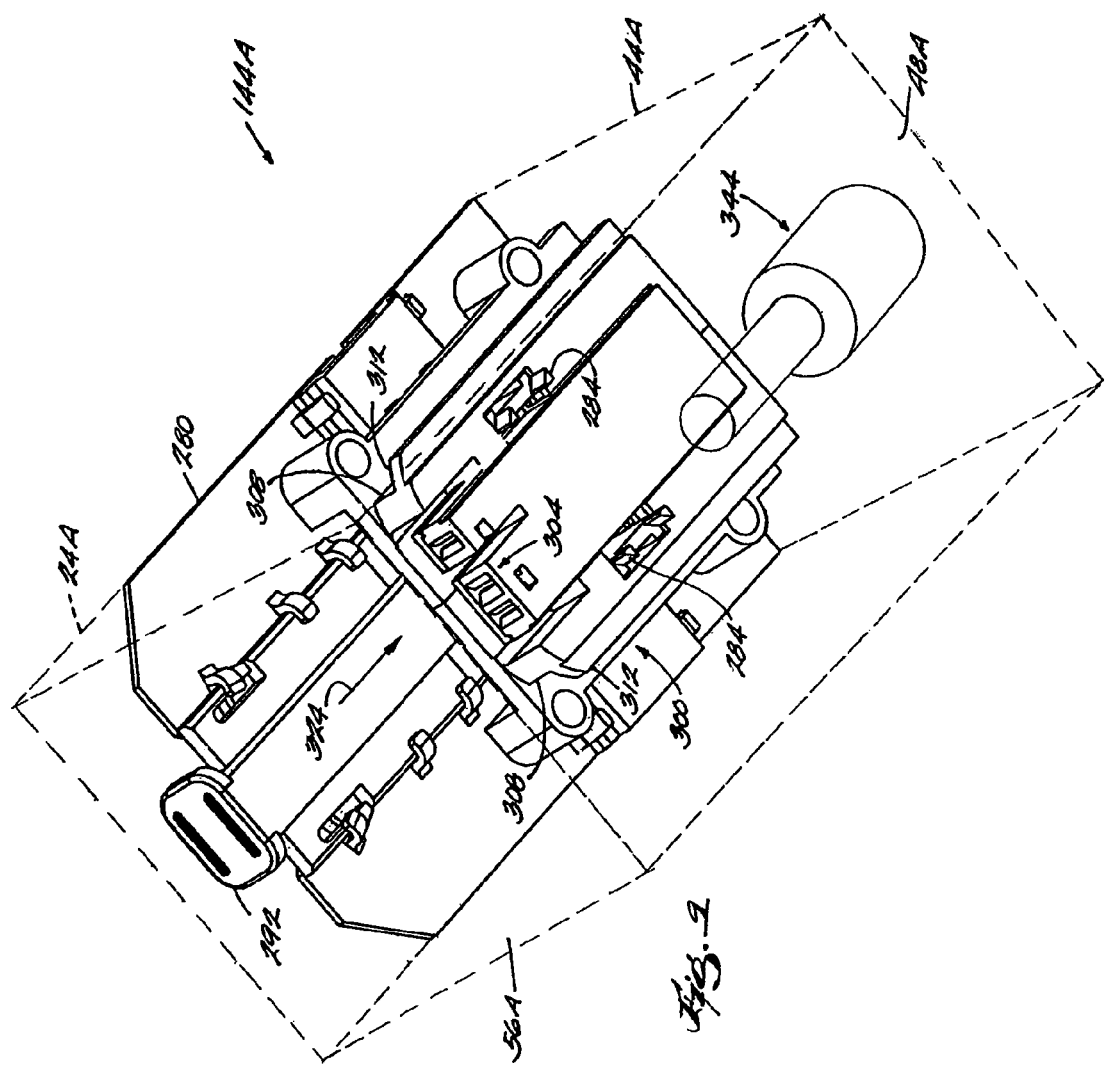
FIG. 9 is a bottom perspective view of an alternate construction of an electrical connector assembly for the electrical component.
Figure 10:
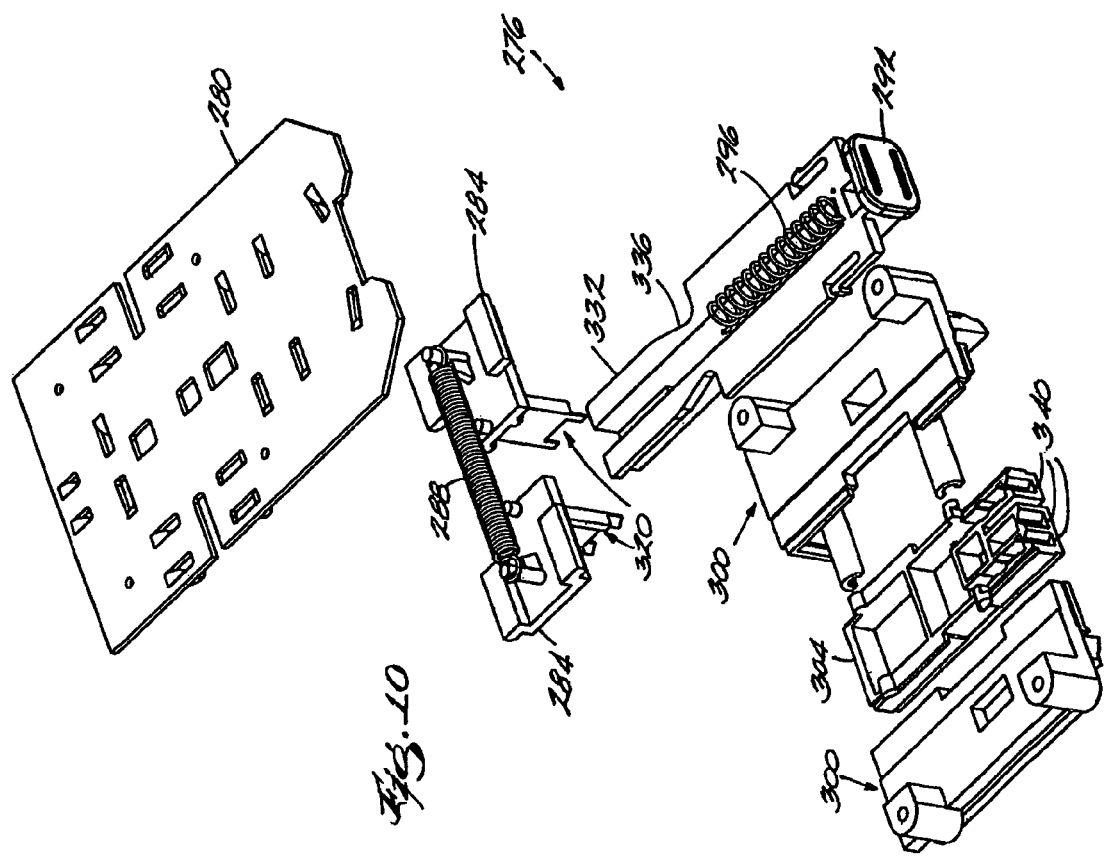
FIG. 10 is an exploded top perspective view of the electrical connector assembly shown in FIG. 9.

An alternate construction of an electrical connector assembly 144A is illustrated in FIGS. 9 and 10. Common elements are identified by the same reference numbers "A".

In the previously-described construction (FIGS. 6-8), the electrical connector assembly 144 is locked to the housing 24 and the battery 70 is supported on the connector assembly 144. In this alternate construction, the battery 70 is locked to the electrical connector assembly 144A. As shown in FIG. 9, the electrical connector assembly 144A is supported by the housing 24A and is positioned in the receptacle 44A. The electrical connector assembly 144A is operable to support the battery 70 in the receptacle 44A, lock the battery 70 relative to the housing 24A, and electrically connect the battery 70 to the electrical circuit 28.

In the illustrated construction, the connector assembly 144A includes a mounting plate 280, latching members or locking members 284, a locking member biasing member or spring 288 (see FIG. 10), an actuator 292, an actuator biasing member or spring 296 (see FIG. 10), a support portion 300, and a terminal assembly 304. The locking members 284, actuator 292, and support portion 300 are mounted to the mounting plate 280, and the terminal assembly 304 is mounted to the support portion 300. The mounting plate 280 is mounted to the housing 24A. The connector assembly 144A has a locked condition, in which the battery 70 is locked to the electrical connector assembly 144A to lock the battery 70 in a position relative to the housing 24A, and an unlocked condition, in which the battery 70 is movable relative to the electrical connector assembly 144A.

The support portion 300 of the connector assembly 144A is complementary to the battery support portion 88 so that the battery 70 is supportable on the support portion 300. The support portion 300 includes grooves 308 and protrusions 312 which extend parallel to the insertion axis 68A. The grooves 308 and protrusions 312 of the support portion 300 are complementary to the grooves 104 and rails 108 of the battery 70, and, therefore, the battery 70 is supported on the connector assembly 144A and electrically connected (by the terminal assembly 304) to the electrical circuit 28A when the battery 70 is inserted into the receptacle 44A.

As shown in FIG. 10, the spring 288 biases the locking members 284 inwardly toward each other. Each locking member 284 includes a recess 320, which receives one of the locking tabs 92 (see FIG. 5) of the battery 70 as the battery 70 is inserted into the receptacle 44A and onto the support portion 300. The battery 70 locks to the electrical connector assembly 144A when the locking tabs 92 engage the recesses 320.

The actuator 292 of the electrical connector assembly 144A is positioned between the locking members 284 and travels along a path 324 parallel to the insertion axis 68. The actuator 292 has a wide portion 332 and a narrow portion 336 positionable between the locking members 284. The actuator 292 is biased to a position corresponding to a locked condition of the connector assembly 144A (and to the locked position of the locking members 284) by the actuator spring 296. When the actuator is in the position corresponding to the locked condition, the wide portion 332 of the actuator 292 is between the locking members 284, and the locking members 284 are biased laterally outwardly to engage the locking tabs 92 of the battery 70.

When the actuator 292 is depressed, the narrow portion 336 is positioned between the locking members 284. The locking members 284 move inwardly under the biasing force of the spring 288 to disengage from the locking tabs 92 of the battery 70 (the unlocked position of the locking members 284 and the unlocked condition of the connector assembly 144A).

The terminal assembly 304 of the connector assembly 144A is mounted to the support portion 300 and is electrically connected to the electrical circuit 28A. The terminal assembly 304 is connectable to the battery terminal assembly 84 to connect the battery 70 to the circuit 28A.

As shown in FIG. 9, a biasing member or ejector 344 is supported on the closed end 48A of the receptacle 44A. The ejector 344 is oriented generally parallel to the insertion axis 68 and is preferably a spring loaded cylinder. The ejector 344 contacts the rear of the battery 70 as the battery 70 is inserted into the receptacle 44A and exerts a biasing force on the rear of the battery 70 toward the open end 56 of the receptacle 44A. As the battery 70 is inserted into the receptacle 44A, the ejector 344 is compressed until the battery 70 is locked to the connector assembly 144A. When the battery 70 is unlocked from the connector assembly 144A, the biasing force of the ejector 344 moves the battery 70 toward the open end 56A to a more accessible position (the ejected position).

Figure 11:
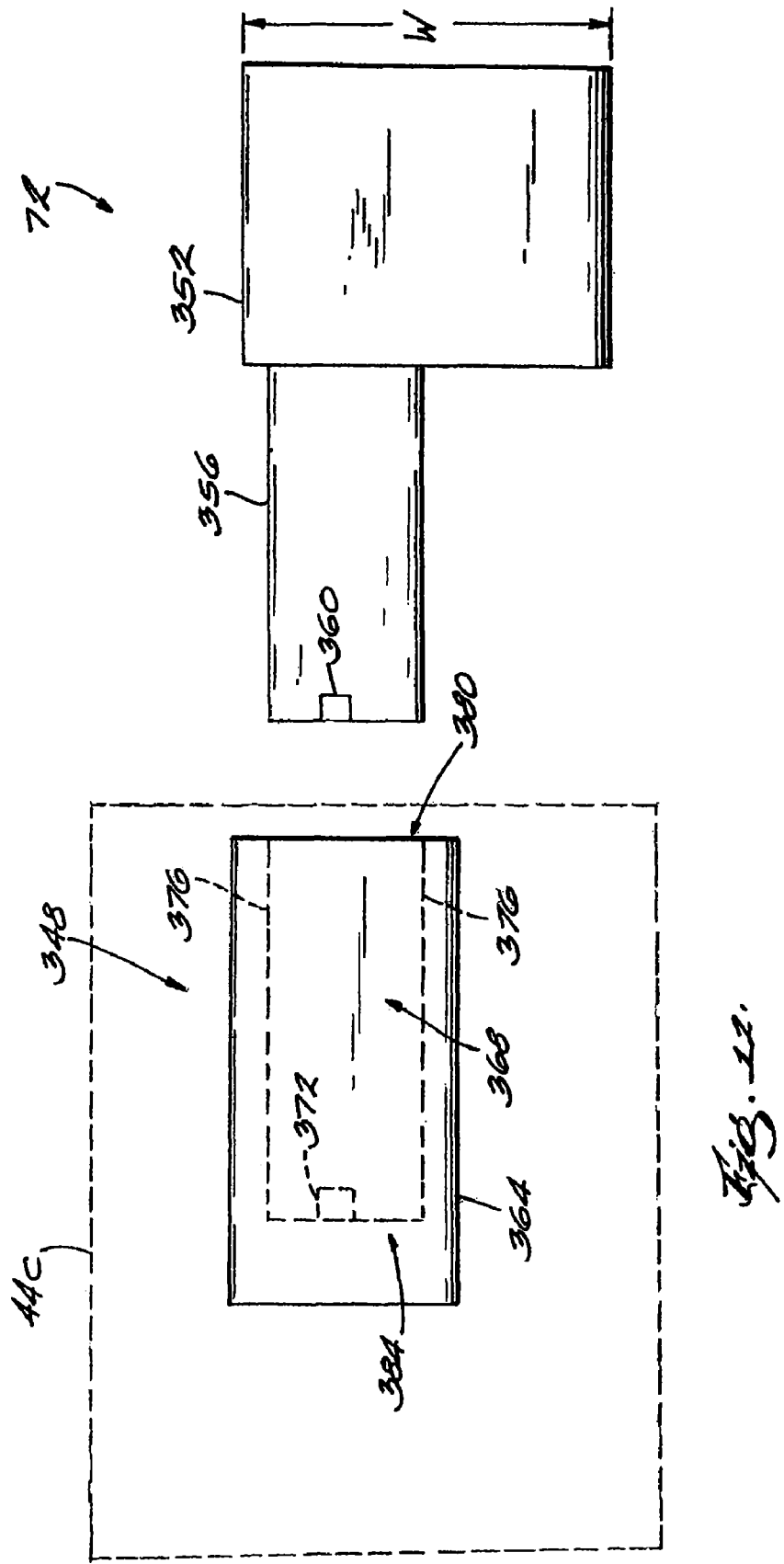
FIG. 11 is a perspective view of an alternate construction of a biasing assembly for the electrical component.

An alternate construction of a portion of an electrical component 20B is illustrated in FIG. 11. Common elements are identified by the same reference numbers "B".

As shown in FIG. 11, a separate locking assembly, such as the locking assembly 168 or 168A, described above, is not provided. In this construction, the cover 66B is used to lock the battery 70 to the electrical component 20B.

In this construction, the cover 66B includes the cover biasing member 69B, which engages the battery 70 and biases the battery 70 rearwardly into the receptacle 44B as the cover 66B is closed. The ejector 344B contacts and exerts a forward biasing force on the rear of the battery 70. When the latch 67B is engaged, the battery 70 is locked in a position relative to the housing 24B.

In FIGS. 1-11 and as described above, aspects of the invention are illustrated as these aspects apply to a slide-on type power tool battery 70. It should be understood that aspects of the invention are applicable to other battery types, such as, for example, a tower type power tool battery 72 (shown in FIG. 12) or a battery for another piece of electrical equipment (not shown).

An alternate construction of a portion of an electrical component 20C is illustrated in FIG. 12. Common elements are identified by the same reference numbers "C".

As shown in FIG. 12, the electrical component 20C includes a tower support portion 348, replacing the slide-on power tool support portion 148 and 300 in the above-described constructions, to receive the tower power tool battery 72. The battery 72 includes a base portion 352, a tower portion 356, and a battery terminal assembly 360 and is usable with a tower power tool (not shown). The support portion 348 is mounted in the receptacle 44C and includes a housing 364 defining a cavity 368 and a support portion terminal assembly 372. The cavity 368 has side walls 376, an open end 380, and a closed end 384. The cavity 368 accommodates the tower portion 356 of the battery 72 to allow the tower portion 356 to insert into the open end 380 of the cavity 368. The support portion terminal 372 is mounted in the cavity 368 and is electrically connected to the electrical circuit 28C.

The tower power tool battery 72 is inserted into the cavity 368 and is supported by the tower power tool support portion 348. When the battery 72 is fully inserted into the cavity 368, the battery terminal assembly 360 contacts the support portion terminal 372, electrically connecting the battery 72 to the electrical circuit 28C.

The support portion 348 may be supported in the receptacle 44 in manners similar to the above-described constructions for the slide-on battery 70. In some constructions (similar to that shown in FIGS. 6-8), the support portion 348 may be movable in the housing 24C to accommodate different types and sizes of tower batteries, and the support portion 348 may be locked in an axial position relative to the housing 24C. In such constructions, the support portion 348 may be biased forwardly to, in the unlocked condition, move the battery 72 to a more accessible position (the ejected position). In some other constructions (similar to that shown in FIGS. 9-10 for the slide-on battery 70), the battery 72 may be locked to the support portion 348, and an ejector (not shown) may be provided to bias the battery 72 out of the receptacle 44C to a more accessible position (the ejected position).

Figure 13:
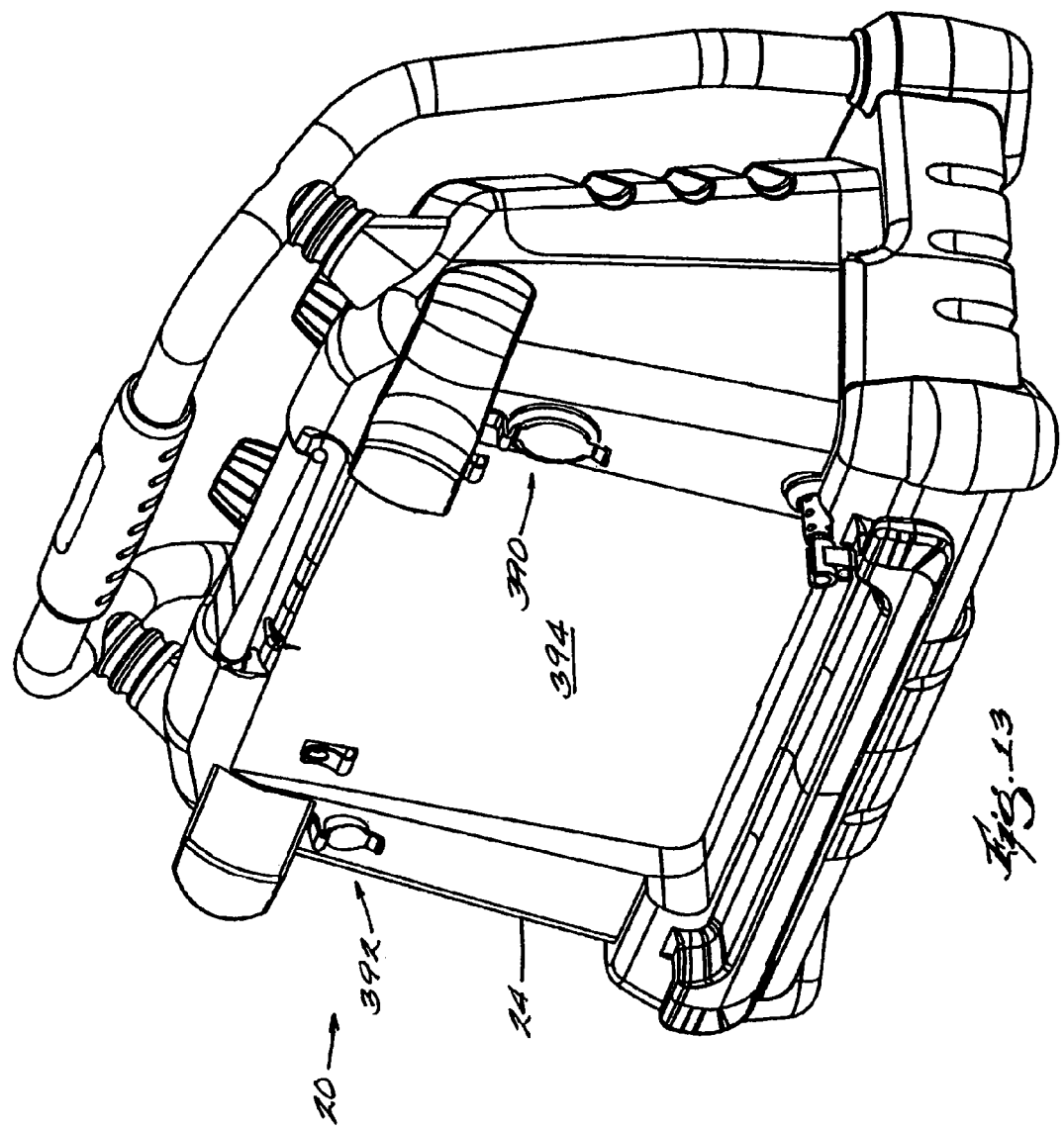
FIG. 13 is a rear perspective view of an alternative construction of an electrical component embodying the invention.

As shown in FIG. 13, the electrical component 20 also includes a DC outlet 390 for supplying power to DC electrical equipment, such as, for example, a cell phone, a cell phone charger, an auxiliary audio component, an automotive power accessory, etc. The power supply portion of the electrical circuit 28 supplies power to the DC outlet 390. The DC outlet 390 is electrically connected to the battery 70 and, therefore, is operable to electrically connect and supply power from the battery 70 to the electrical equipment. The DC outlet 390 is also connectable to the AC power source through the electrical circuit 28 to connect the electrical equipment to the AC power source. The electrical circuit 28 is protected by a double fuse design having a resettable thermal fuse and a replaceable fuse.

The electrical component 20 also includes an auxiliary plug 392 for connecting an auxiliary component (not shown), such as, for example, a tape player, a CD player or MP3 player, to the audio circuit portion 29. The power amplifier portion of the electrical circuit 28 amplifies the input of the auxiliary component. The electrical circuit 28 thus provides a loop for an auxiliary component in which the power supply portion powers the auxiliary component and the power amplifier portion receives and amplifies the input from the auxiliary component.

Figure 14:
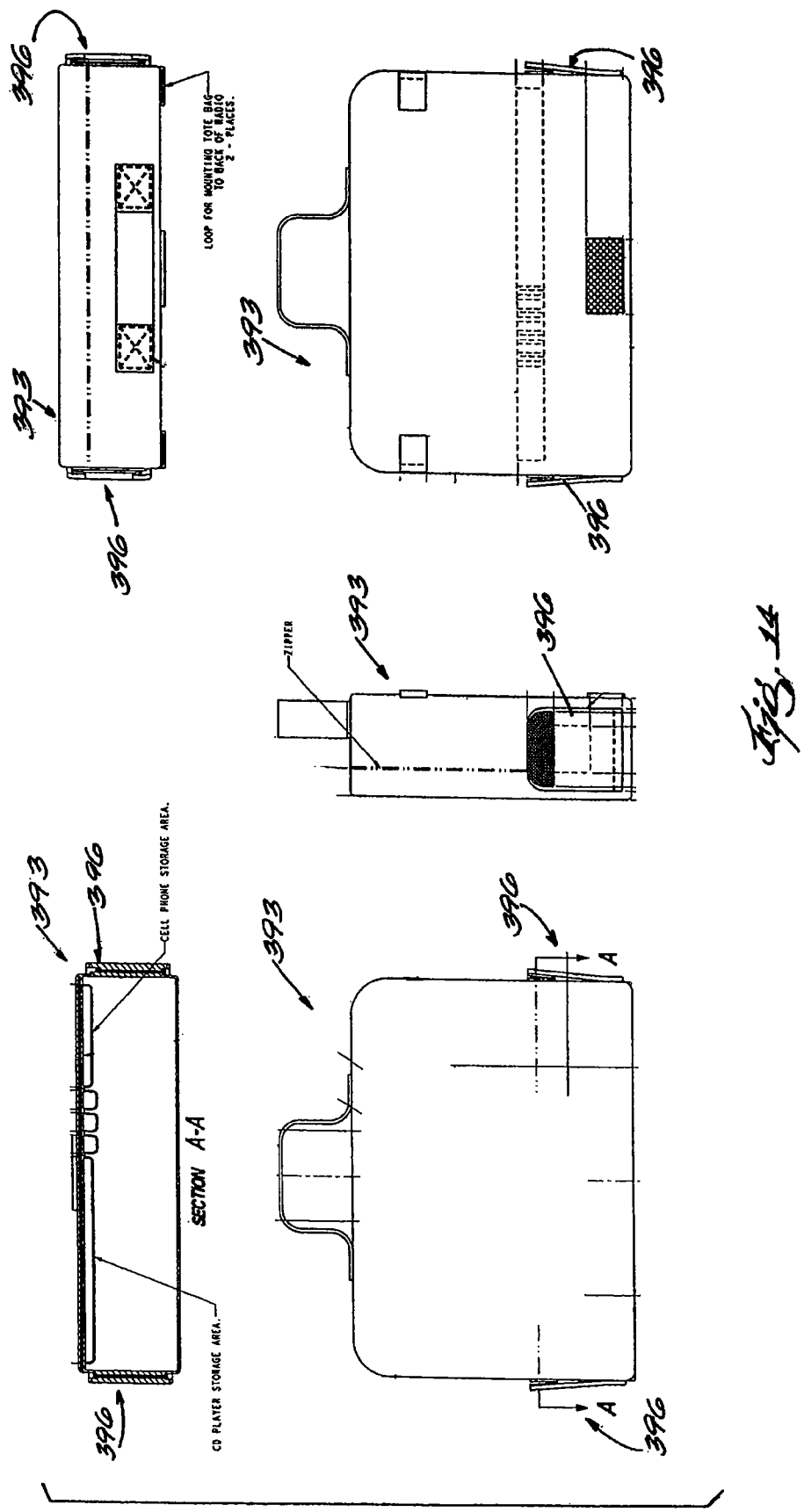
FIG. 14 are views of an accessory bag for use with the electrical component.

As shown in FIG. 14, the electrical component 20 also includes an accessory bag 393 selectively mountable in a rear well portion 394 (see FIG. 13) of the housing 24. The accessory bag 393 is selectively detachable and attachable to the electrical component 20, and items, such as, the DC electrical equipment and supplies, can be stored in the accessory bag 393. The accessory bag 393 includes openings 396 through which cords pass to connect auxiliary components in the accessory bag 393 to the DC outlet 390 and/or to the auxiliary plug 392. The opening 396 may be substantially closed (for example, by zippers or VELCRO® strips) during operation to substantially enclose the contents of the accessory bag 393.

Figure 15:
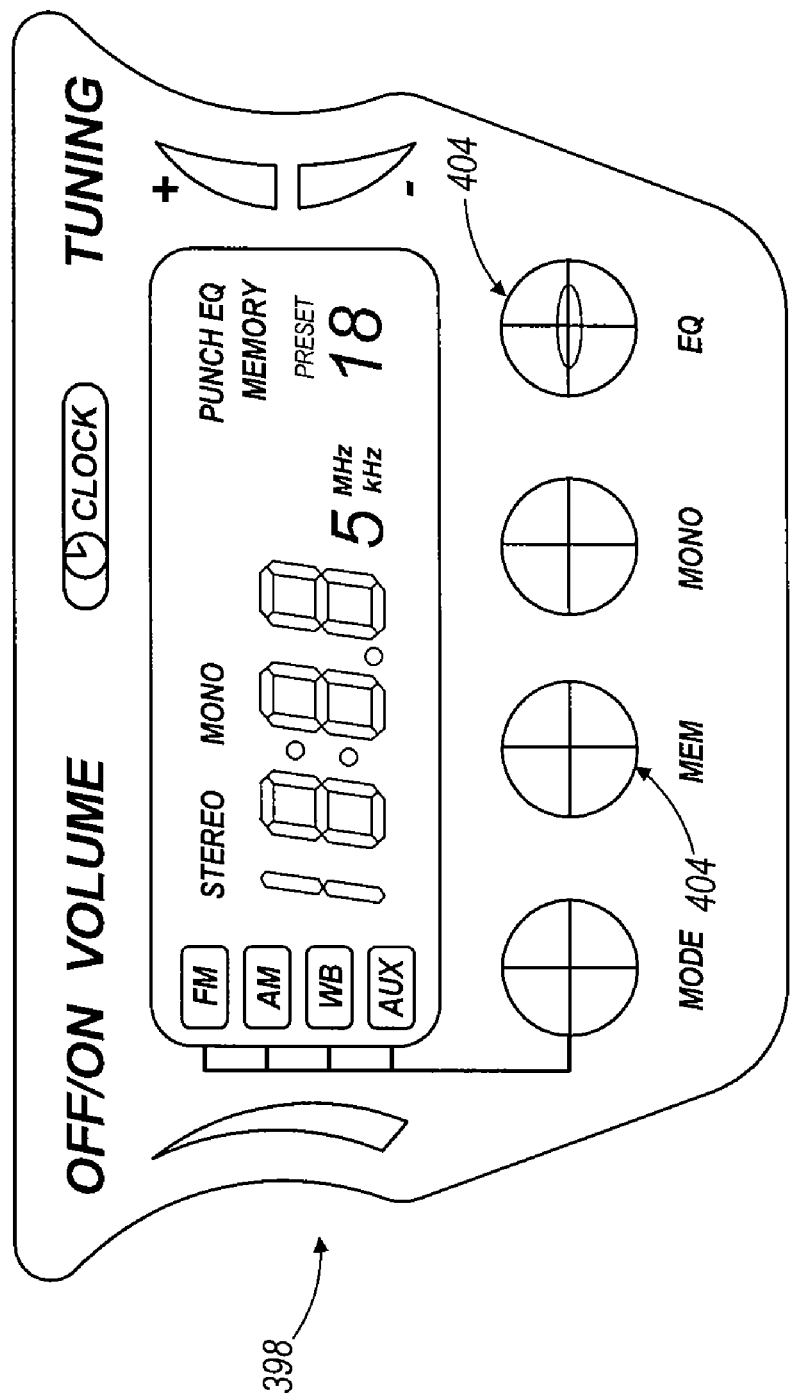
FIG. 15 is a front view of a display for the electrical component.
Figure 16:
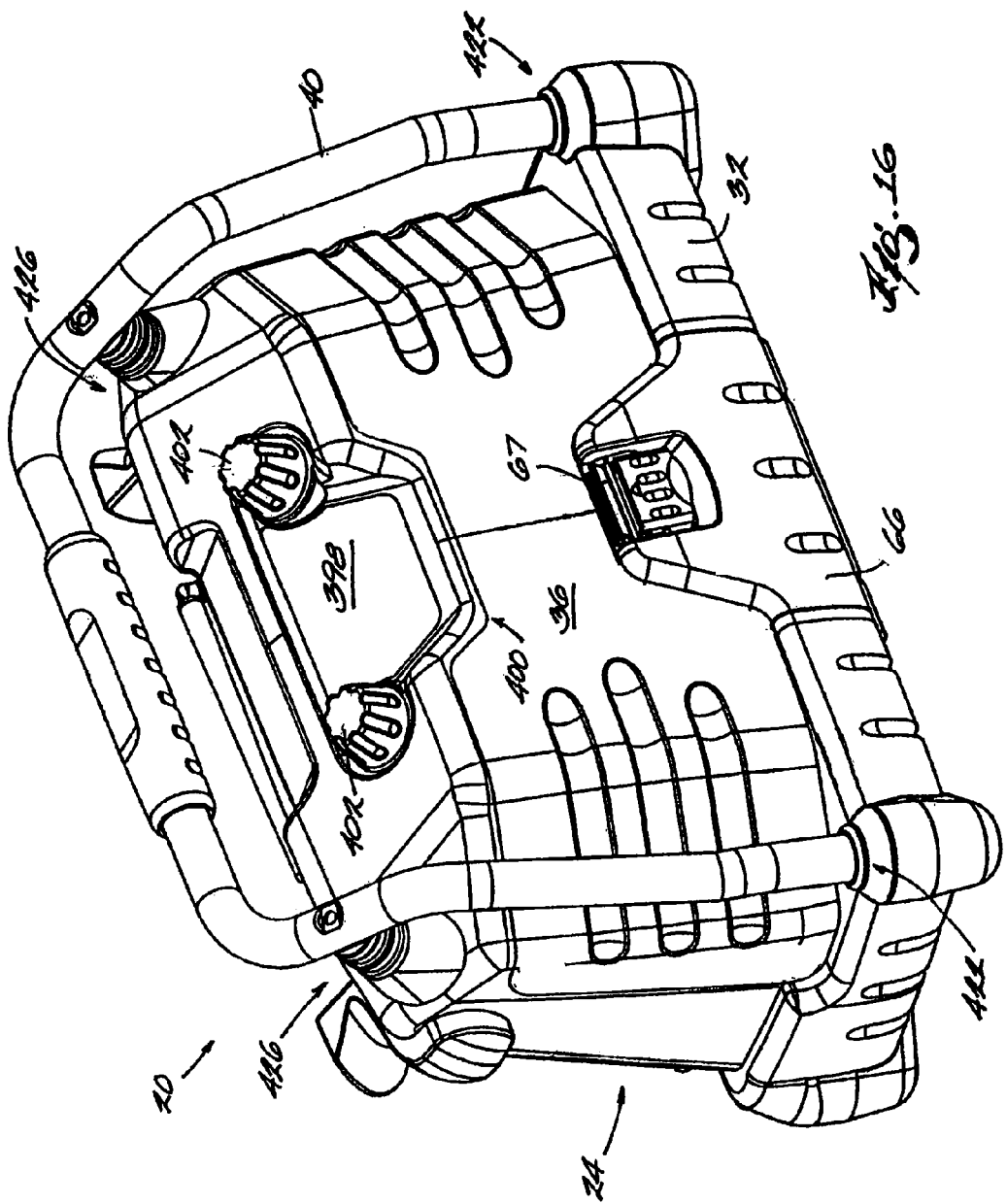
FIG. 16 is a front perspective view of the electrical component shown in FIG. 13.

The electrical circuit 28 also includes (see FIG. 15) a display portion 398 positioned on the front of the electrical component 20. The display portion 398 is preferably a backlit LCD display capable of displaying the status and operating condition of the electrical component 20 and of the electrical circuit 28. For example, the display portion 398 displays the operating mode of the audio circuit portion 29 (i.e., AM, FM, AUX, etc.). If the audio circuit portion is operating in a radio mode, the display portion 398 displays the current station. The display portion 398 may also include a clock or other informational displays.

The electrical component 20 also includes (see FIGS. 1 and 15) a control portion 400 for controlling the operation and operating mode of the electrical component 20 and of the electrical circuit 28. The control portion 400 includes (see FIG. 1) adjustment knobs 402 for adjusting the volume and for tuning the radio. The control portion 400 also includes (see FIG. 15) control buttons 404 for controlling other operations, such as pre-set radio station selection, equalization setting, etc. Preferably, the electrical component 20 includes a "PUNCH EQ" feature having several pre-set equalization settings. The "PUNCH EQ" button 404 is a color lit button using different colors (red, yellow, green) representing the different equalization setting and to indicate the current equalization setting.

Figure 17:
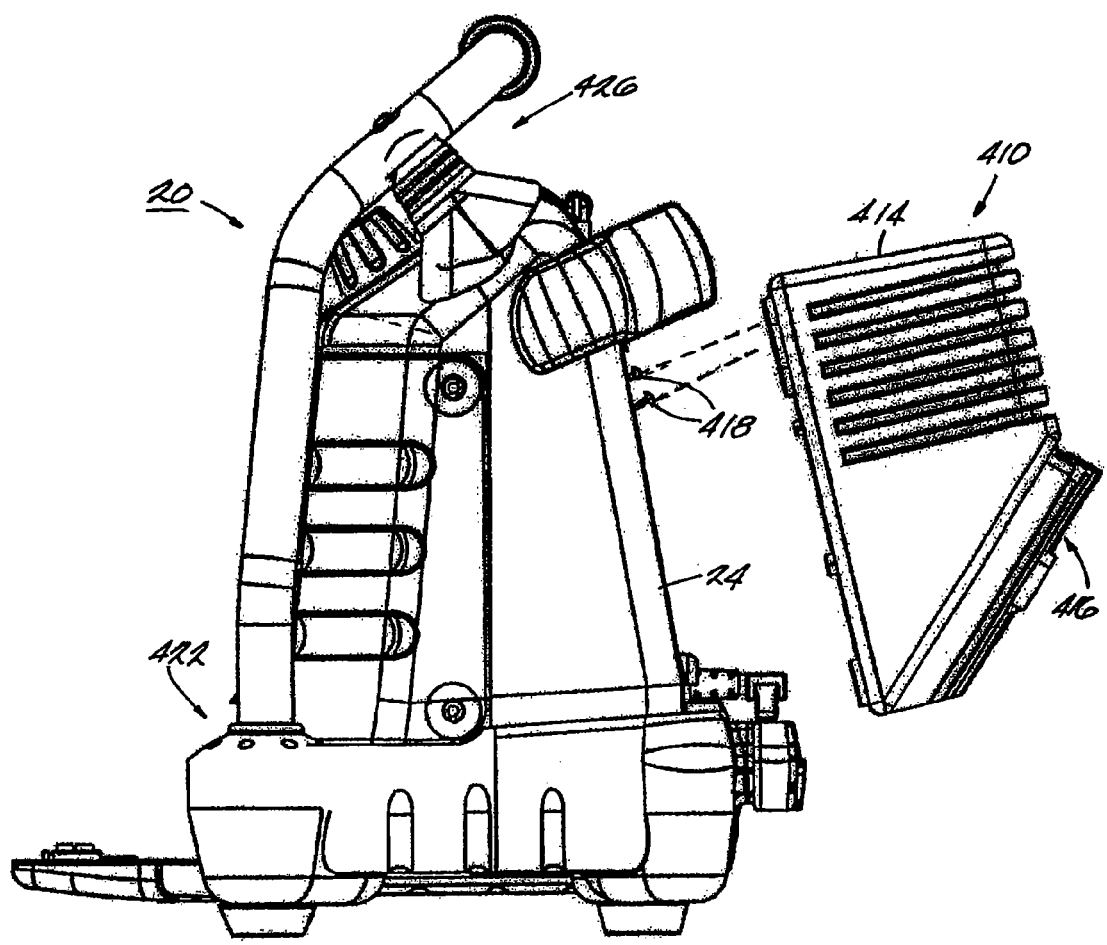
FIG. 17 is a side view of another alternate construction of the electrical component and a separate battery charger.

In an alternative construction (shown in FIG. 17), the electrical component 20 may not include a charging circuit portion to charge a battery 64. A separate battery charger 410 may be used with the electrical component 20. The charger 410 may be supported in the accessory bag 393 or may be independently mountable in the rear well portion 394 of the housing 24 in a manner similar to the support of the accessory bag 393. Such a battery charger 410 includes a charger housing 414 providing a battery support portion 416 on which a battery 64 is supportable. A charging circuit (not shown) is supported by the charger housing 414 and is connectable to the battery 64 and to a power source (not shown). The charging circuit may be connected to the power source through an outlet on the electrical component 20 (i.e., the DC outlet 390 or an AC outlet (not shown) on the electrical component 20) or on the power cord for the electrical component 20 or through a power source outlet (i.e., a wall plug). In other constructions (not shown), the battery charger 410 may be connectable to the power source through cooperating terminal assemblies (not shown) on the battery charger 410 and on the electrical component 20.

In the illustrated construction, the electrical component 20 includes headed fasteners 418 which are received in openings (not shown) defined in the housing 414 of the battery charger 410 to connect the battery charger 410 to the electrical component 20. The openings may include a wide portion for receiving the head of a fastener 418 and a narrow slot portion into which the fastener 418 slides to prevent the fastener 418 from being removed from the opening to thereby prevent the battery charger 410 from being disconnected from the electrical component 20. The electrical component 20 and separate battery charger 410 provide a connectable housing assembly. The electrical component 20 may accommodate different types of battery chargers and, therefore, be capable of charging different types and sizes of batteries, including slide-on power tool batteries 64 (with the battery charger 410 and supported on the battery support portion 416), other types of slide-on power tool batteries (not shown, with another type of slide-on battery charger (not shown)) and tower power tool batteries (with a tower battery charger (not shown)) and batteries for other electrical components and/or other electrical equipment (with respective compatible battery chargers (not shown)).

Figure 18:
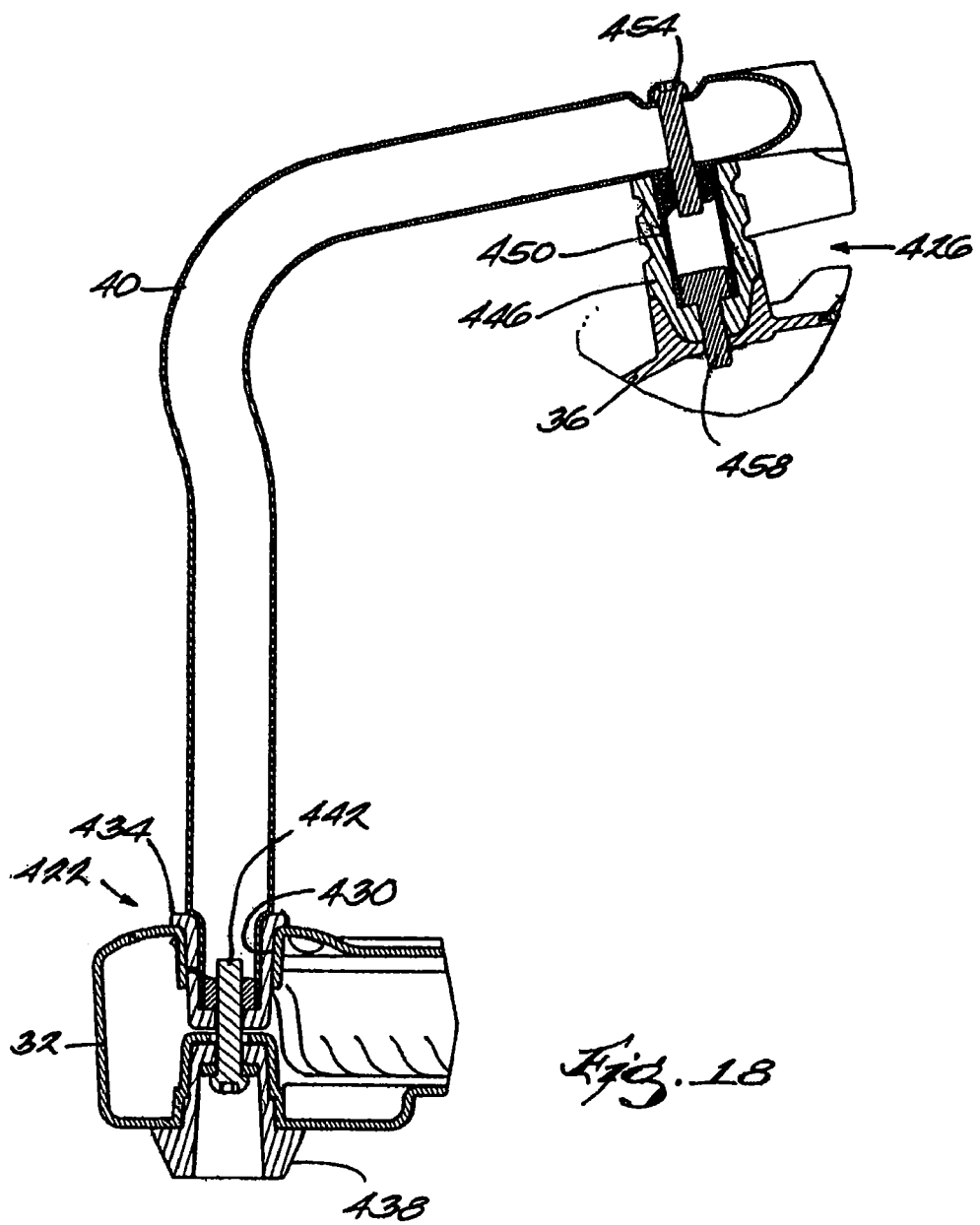
FIG. 18 is a side cross-sectional view of a portion of the electrical component shown in FIG. 1 illustrating the connection of the handle and the housing.
Figure 19:
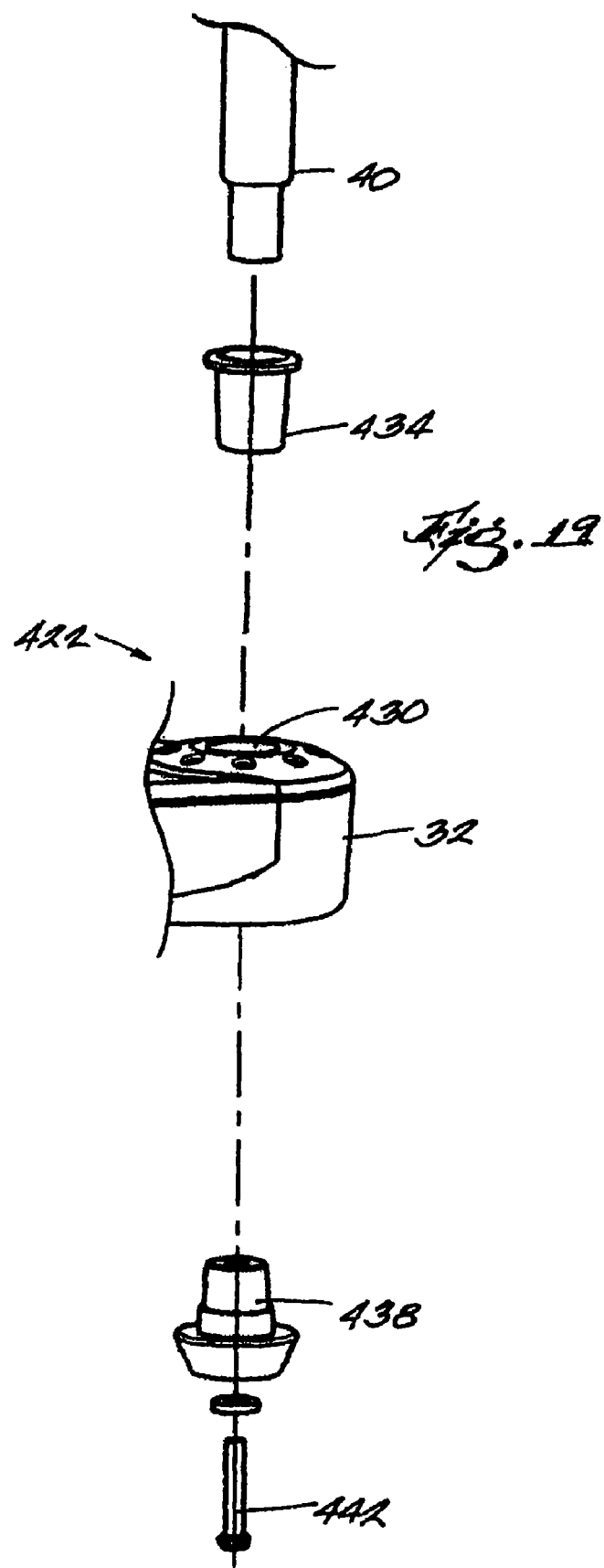
FIG. 19 is an exploded perspective view of a lower portion of the connection shown in FIG. 18.
Figure 20:
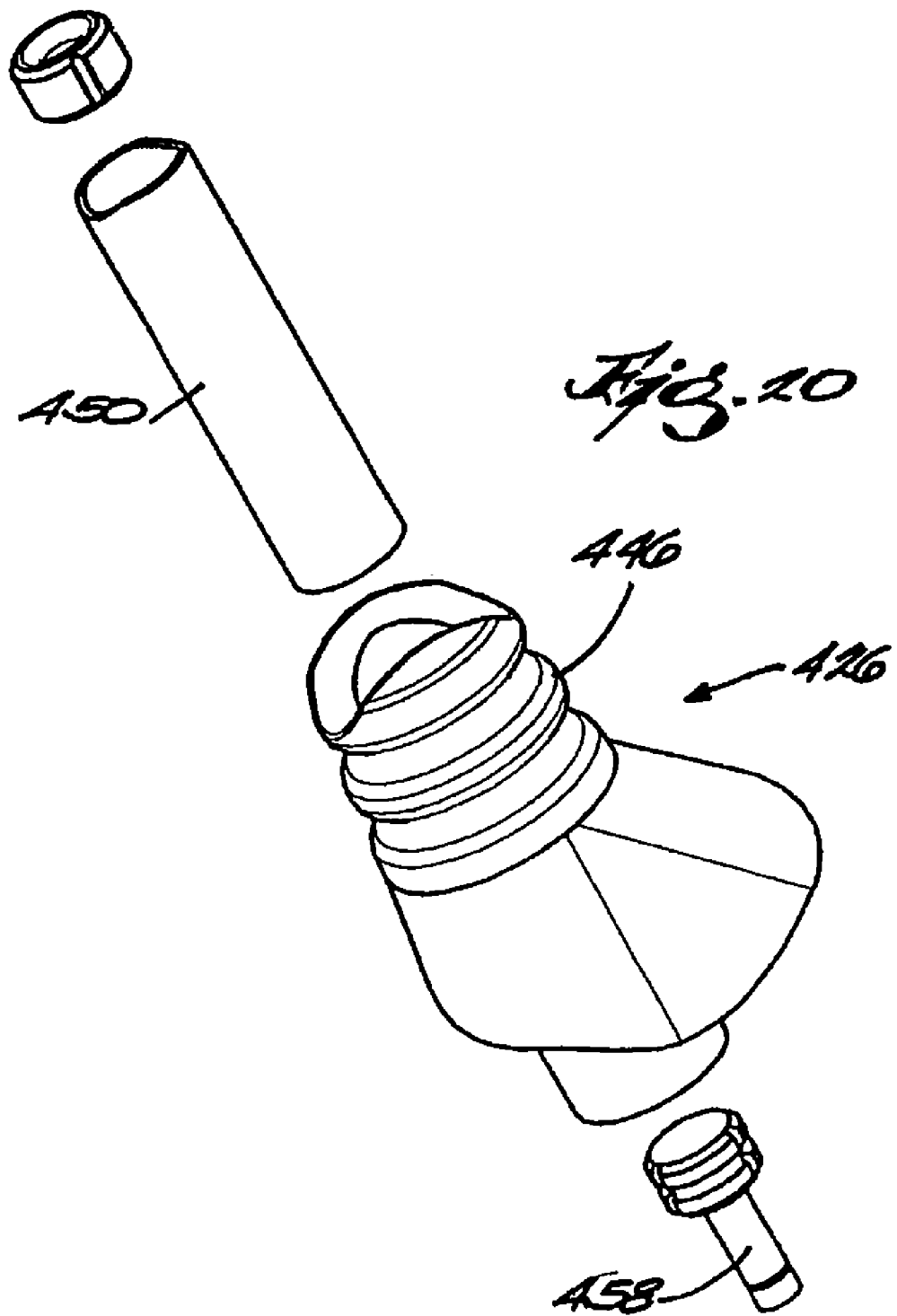
FIG. 20 is an exploded perspective view of an upper portion of the connection shown in FIG. 18.

FIGS. 18-20 illustrate the connection of the handle portion 40 to the base portion 32 and to the main portion 36 of the housing 24. In the illustrated construction, the handle portion 40 is connected to both the base portion 32 and the main portion 36 at two locations by base connecting assemblies 422 and main connecting assemblies 426, respectively. The base connecting assemblies 422 are similar to one another, and the main connecting assemblies 426 are similar to each other. Therefore, only one base connecting assembly 422 and one main connecting assembly 426 will be described in detail.

As shown in FIGS. 18-19, the base portion 32 defines a base aperture 430, and the base connecting assembly 422 includes an upper insert 434 and a lower insert 438 received in the base aperture 430. A threaded member 442 connects the lower insert 438 to one end of the handle portion 40 and to the upper insert 434 so that the handle portion 40 is flexibly mounted to the base portion 32.

As shown in FIGS. 18 and 20, the main connecting assembly 426 includes a flexible member 446 surrounding a tube 450. Fasteners 454 and 458 connect the handle portion 40 and the main portion 36, respectively, to the flexible member 446 and the tube 450 so that the handle portion 40 is flexibly mounted to the main portion 36. The main connecting assembly 426 absorbs shocks to the upper portion of the handle portion 40.

For purposes of description, "upward" is defined as being generally in the direction of the display portion 398 from the base portion 32 along a vertical axis that is generally perpendicular to the insertion axis 68. Similarly, "downward" is defined relative to "upward" as being generally in the direction of the base portion 32 from the display portion 398 along a vertical axis that is generally perpendicular to the insertion axis 68.

Figure 21:
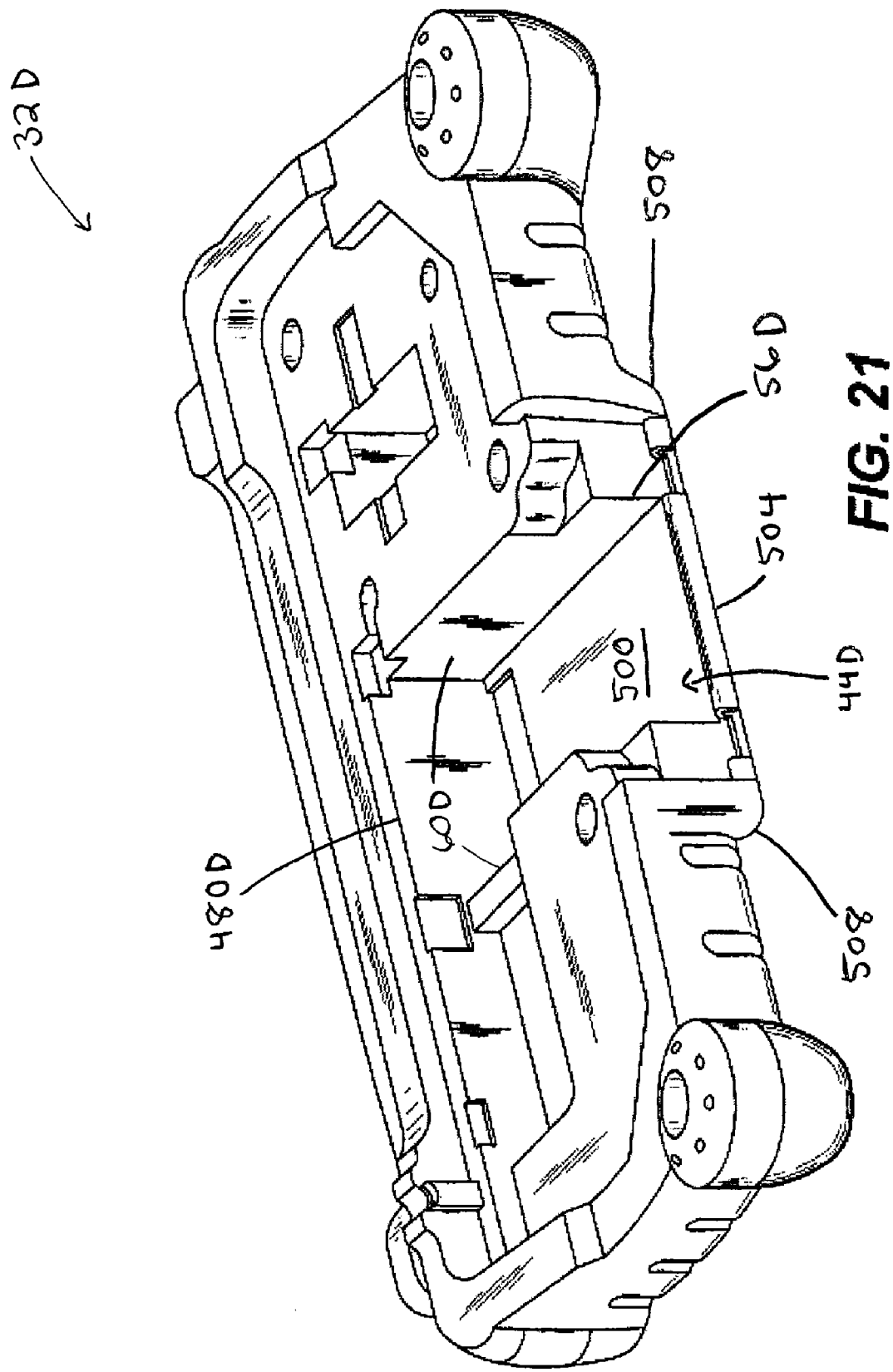
FIG. 21 is a perspective view of an alternate construction of a base portion of an electrical component.

An alternate construction of a portion of an electrical component 20D is illustrated in FIG. 21. Common elements are identified by the same reference numbers "D".

In the illustrated construction, the electrical component 20D may be modified to, for example, also accommodate a battery, such as a battery of 28 V, 40 V, 48 V, etc., which is larger (e.g., having an increased length, height and/or depth) than that illustrated in FIG. 5. Such a battery may be similar to that described and illustrated in U.S. patent application Ser. No. 10/721,800, filed on Nov. 24, 2003, now U.S. Patent Application Publication No. US 2004/0257038 A1, published Dec. 23, 2004; U.S. patent application Ser. No. 11/165,615, filed on Jun. 22, 2005; U.S. patent application Ser. No. 10/720,027, filed on Nov. 20, 2003, now U.S. Patent Application Publication No. US 2005/0007068 A1, published on Jan. 13, 2005; or U.S. patent application Ser. No. 11/138,070, filed on May 24, 2005; the entire contents of all of which are hereby incorporated by reference.

As shown in FIG. 21, the base portion 32D may be modified to accommodate such a larger battery. In the illustrated construction, the lower surface 500 of the receptacle or battery compartment 44D may be moved downwardly to, for example, accommodate a taller battery, to provide improved access to a previously-illustrated battery, etc. The hinge 504 may also be moved downward so as to be even with the lowered bottom surface 500 of the battery compartment 44D. A radius 508 may be added to the base 32D to smooth out the transition to the dropped-down receptacle 44D. In addition, the sidewalls 60D may be spaced further apart to receive a wider battery.

In other constructions, dimensions of the receptacle 44D may be changed in multiple ways (e.g. length, width, height) to accommodate a battery which is larger in any such dimension.

Figure 22:
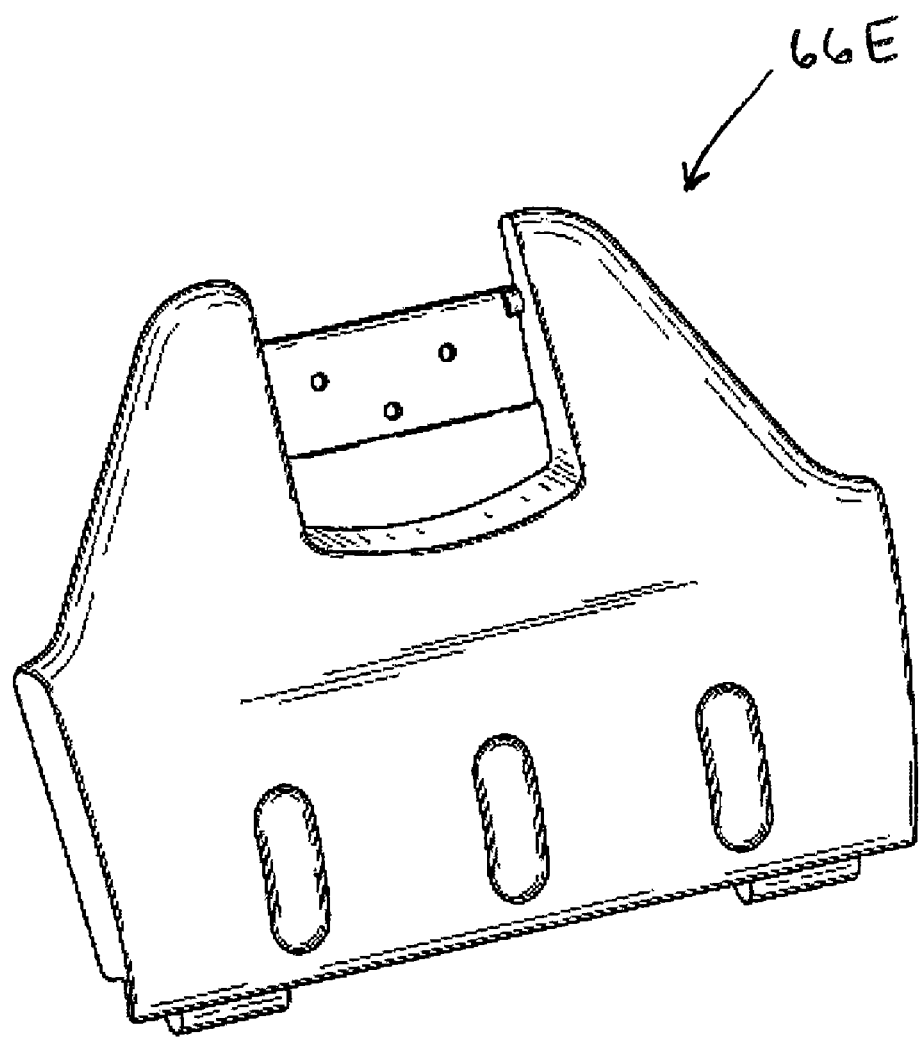
FIG. 22 is a perspective view of an alternate construction of a cover of an electrical component.

An alternate construction of a portion of an electrical component 20E is illustrated in FIG. 22. Common elements are identified by the same reference numbers "E".

The battery door or cover 66E may be modified to accommodate a larger battery. In the illustrated construction, the cover 66E may be increased in size (e.g. lengthened from top to bottom as shown in FIG. 22) to cover the larger size of the battery compartment 44D. A larger cover 66E may also provide improved access to the battery compartment 44D.

Figure 23:
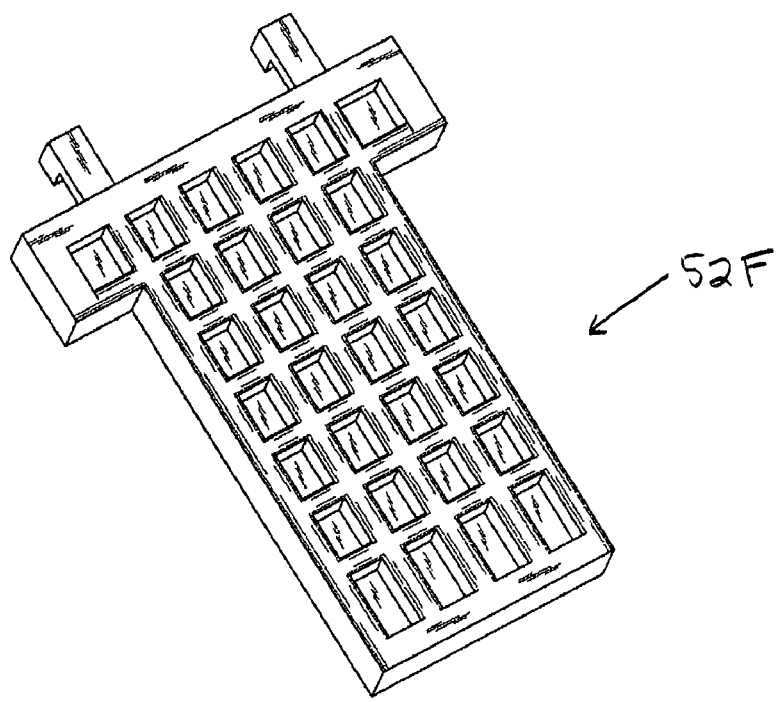
FIG. 23 is a perspective view of an alternate construction of a bumper of an electrical component.

An alternate construction of a portion of an electrical component 20F is illustrated in FIG. 23. Common elements are identified by the same reference numbers "F".

FIG. 23 shows the alternate construction for the battery cushion or bumper 52F. The battery cushion 52F may be modified to fit the base 32D. In the illustrated construction, the battery cushion 52F may be lengthened (from top to bottom as shown in FIG. 23), and material that is not required, for example, edge portions, may be removed.

Figure 24:
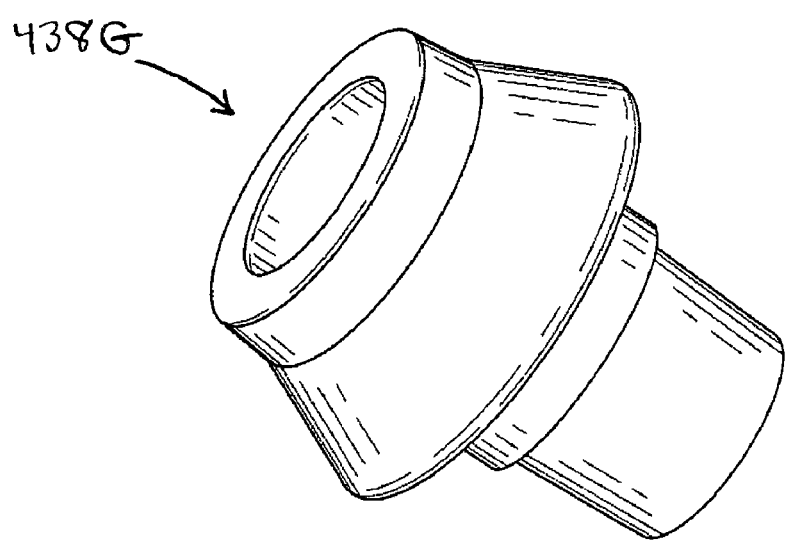
FIG. 24 is a perspective view of an alternate construction of a lower insert of an electrical component.
Figure 25:
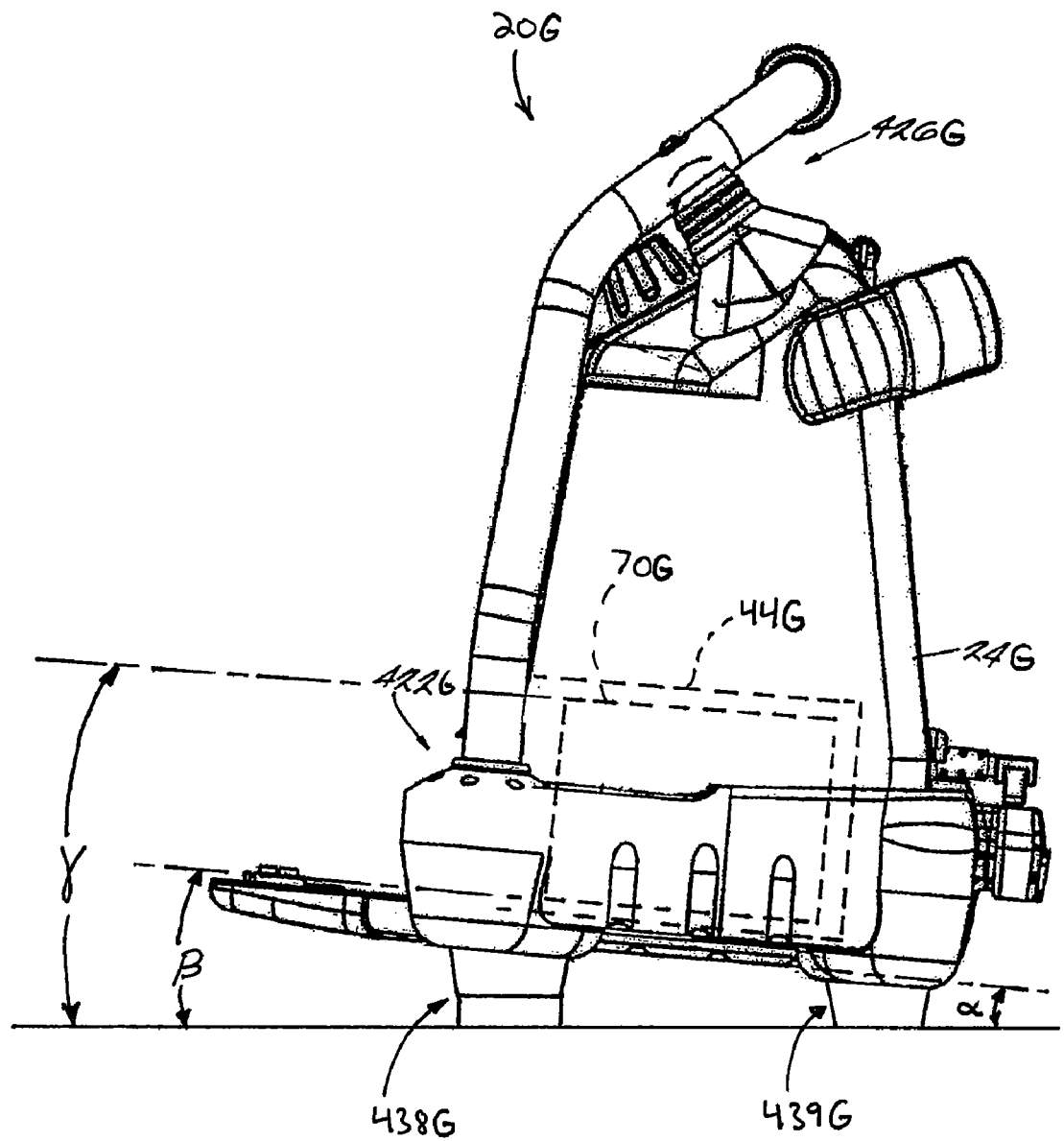
FIG. 25 is a side view of an electrical component with the lower insert shown in FIG. 24.

An alternate construction of a portion of an electrical component 20G is illustrated in FIGS. 24 and 25. Common elements are identified by the same reference numbers "G".

In the new construction, the front base cushion 438G may have an increased height to raise the front of the base 32 relative to the surface on which the electrical component 20G is supported. In this manner, the battery door 66F may open further (when compared to the position of the door 66 shown in FIG. 17). When the battery door 66F is opened further, it can lay flat to, for example, allow for easier insertion and removal of the battery, avoid engagement with the spring 56, etc. In some constructions, only the front base cushions 438G are increased in height and the rear base cushions 439G are not increased in height. In this construction the electrical component will be inclined relative to a surface upon which the electrical component sits. The electrical component is inclined upward from the rear to the front. This inclination will also incline the battery receptacle, thereby inclining the battery supported in the receptacle, relative to the surface upon which the electrical component sits. Accordingly, the battery will be discharged at an upward angle, which will improve access to the battery. Likewise, the battery will be inserted into the receptacle at a downward angle, thereby easing insertion of the battery.

Figure 26:
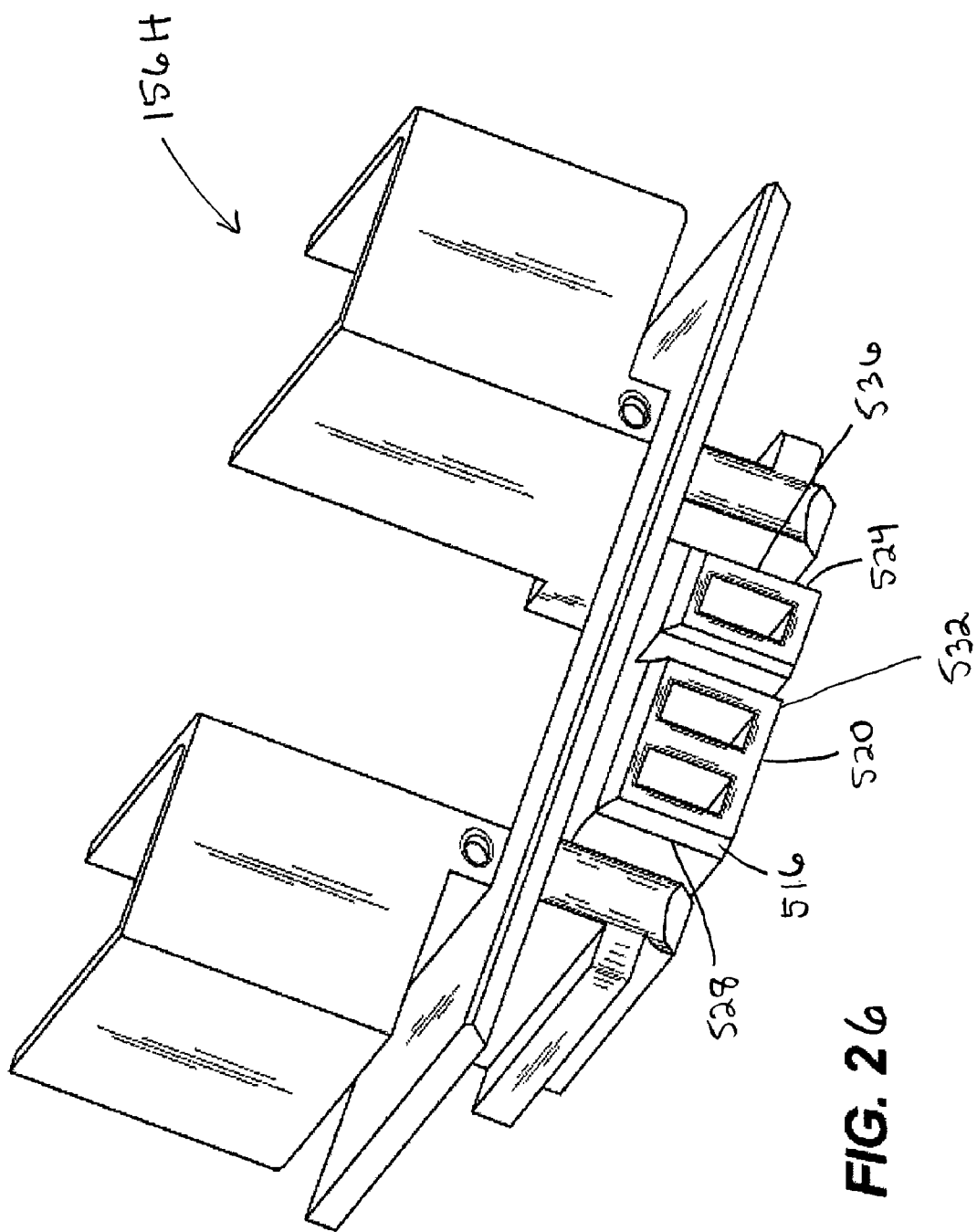
FIG. 26 is a perspective view of an alternate construction of a terminal assembly of an electrical component.

An alternate construction of a portion of an electrical component 20H is illustrated in FIG. 26. Common elements are identified by the same reference numbers "H".

In this construction, the terminal assembly 156H may be modified to accommodate a larger battery. Additional chamfers 516, 520 and 524 may be added as shown in FIG. 26. One or more of a first side 528, a bottom 532 and a second side 536 of the battery connector 156H may be chamfered to, for example, help guide the battery onto the connector 156H.

One or more of the above described independent features may be incorporated into other constructions of an electrical component, such as those described and illustrated in U.S. Patent Application Publication Nos. US 2005/0083013 A1, published Apr. 21, 2005 (U.S. Ser. No. 10,926,744, filed Aug. 26, 2004); and US 2005/0083639 A1, published Apr. 21, 2005 (U.S. Ser. No. 10/926,883, filed Aug. 26, 2004); the entire contents of both of which are hereby incorporated by reference.

Although particular constructions of the present invention have been shown and described, other alternative constructions will be apparent to those skilled in the art and are within the intended scope of the present invention. Thus, the present invention is to be limited only by the claims.

What is claimed is:

1. An audio component supportable on a support surface, the audio component comprising:
    a housing defining a receptacle for receiving a power tool battery, the power tool battery including a top surface and a bottom surface, at least a portion of the top surface and the bottom surface being substantially planar;
    an audio circuit supported by the housing and operable to produce an audio signal; and
    a base coupled to the housing, the base including
        a front portion protruding from a bottom surface of the base and being engageable with the support surface, and
        a rear portion protruding from the bottom surface of the base and being engageable with the support surface, the front portion having a first height and the rear portion have a second height less than the first height;
    wherein at least one of the base bottom surface, the planar portion of the battery top surface and the planar portion of the battery bottom surface is inclined relative to the support surface when the power tool battery is positioned in the receptacle and the front and rear portions of the base engage the support surface.

2. The audio component of claim 1, wherein all of the base bottom surface, the planar portion of the battery top surface and the planar portion of the battery bottom surface are inclined relative to the support surface when the power tool battery is positioned in the receptacle and the front and rear portions of the base engage the support surface.

3. The audio component of claim 1, wherein the front portion of the base is a front cushion coupled to the bottom surface of the base and the rear portion of the base is a rear cushion coupled to the bottom surface of the base, the front cushion having the first height and the rear cushion having the second height less than the first height.

4. An electrical component supportable on a support surface, the electrical component comprising:
    a housing defining a receptacle for receiving a battery, the battery including a top surface and a bottom surface, at least a portion of the top surface and the bottom surface being substantially planar;
    an electrical circuit supported by the housing; and
    a base coupled to the housing, the base including
        a front portion protruding from a bottom surface of the base and being engageable with the support surface, and
        a rear portion protruding from the bottom surface of the base and being engageable with the support surface, the front portion having a first height and the rear portion have a second height less than the first height;
    wherein at least one of the base bottom surface, the planar portion of the battery top surface and the planar portion of the battery bottom surface is inclined relative to the support surface when the battery is positioned in the receptacle and the front and rear portions of the base engage the support surface.

5. The electrical component of claim 4, wherein the bottom surface of the base is inclined relative to the support surface.

6. The electrical component of claim 4, wherein the top surface of the battery is inclined relative to the support surface.

7. The electrical component of claim 4, wherein the bottom surface of the battery is inclined relative to the support surface.

8. The electrical component of claim 4, wherein both the top surface and the bottom surface of the battery are inclined relative to the support surface.

9. The electrical component of claim 4, wherein all of the base bottom surface, the planar portion of the battery top surface and the planar portion of the battery bottom surface are inclined relative to the support surface.

10. The electrical component of claim 4, wherein the front portion of the base is a front cushion coupled to the bottom surface of the base and the rear portion of the base is a rear cushion coupled to the bottom surface of the base, the front cushion having the first height and the rear cushion having the second height less than the first height.

11. The electrical component of claim 4, wherein the electrical component is an audio component and the electrical circuit is an audio circuit capable of producing an audio signal.

12. The electrical component of claim 4, wherein the electrical component is a battery charger and the electrical circuit is a charging circuit capable of charging the battery.

13. The electrical component of claim 4, wherein the battery is a power tool battery operable to power a power tool.

14. An audio component supportable on a support surface, the audio component comprising:
    a housing defining a receptacle having an open end, the open end having a receptacle height, the housing including a cover selectively closing the open end of the receptacle;
    an audio circuit supported by the housing and operable to produce an audio signal, a first power tool battery having a first height being supportable in the receptacle and electrically connectable to the audio circuit, a second power tool battery having a second height different than the first height being supportable in the receptacle and electrically connectable to the audio circuit, wherein the receptacle height is greater than the first height and the second height, and the receptacle selectively receives one of the first power tool battery and the second power tool battery; and
    a base coupled to the housing, the base including a front portion protruding from a bottom surface of the base and being engageable with the support surface, and a rear portion protruding from the bottom surface of the base and being engageable with the support surface, the front portion having a first height and the rear portion have a second height less than the first height;

wherein the first power tool battery includes a first top surface and a first bottom surface and the second power tool battery includes a second top surface and a second bottom surface, and wherein at least one of the base bottom surface, a planar portion of the first power tool battery top surface, a planar portion of the first power tool battery bottom surface, a planar portion of the second power tool battery top surface, and a planar portion of the second power tool battery bottom surface is inclined relative to the support surface when the first or second power tool battery is positioned in the receptacle and the front and rear portions of the base engage the support surface.

15. An electrical component supportable on a support surface, the electrical component comprising:

a housing defining a receptacle having an open end, the housing including a cover selectively closing the open end of the receptacle; and an electrical circuit supported by the housing, a first battery having a first height being supportable in the receptacle and electrically connectable to the electrical circuit, a second battery having a second height different than the first height being supportable in the receptacle and electrically connectable to the electrical circuit, the receptacle selectively receives one of the first battery and the second battery; and a base coupled to the housing, the base including
a front portion protruding from a bottom surface of the base and being engageable with the support surface, and a rear portion protruding from the bottom surface of the base and being engageable with the support surface, the front portion having a first height and the rear portion have a second height less than the first height;

wherein the first battery includes a first top surface and a first bottom surface and the second battery includes a second top surface and a second bottom surface, and wherein at least one of the base bottom surface, a planar portion of the first battery top surface, a planar portion of the first battery bottom surface, a planar portion of the second battery top surface, and a planar portion of the second battery bottom surface is inclined relative to the support surface when the first or second battery is positioned in the receptacle and the front and rear portions of the base engage the support surface.

16. The electrical component of claim 15, wherein the electrical component is an audio component and the electrical circuit is an audio circuit capable of producing an audio signal.

17. The electrical component of claim 15, wherein the electrical component is a battery charger and the electrical circuit is a charging circuit capable of selectively charging the first battery and the second battery.

18. The electrical component of claim 15, wherein the first battery is a first power tool battery operable to power a power tool and the second battery is a second power tool battery operable to power a power tool.

* * * * *